United States Patent [19]
Hamilton et al.

[11] Patent Number: 5,630,618
[45] Date of Patent: May 20, 1997

[54] HYBRID INFLATOR WITH A VALVE

[75] Inventors: Brian K. Hamilton, Littleton; Brent A. Parks, Englewood, both of Colo.

[73] Assignee: OEA, Inc., Aurora, Colo.

[21] Appl. No.: 518,925

[22] Filed: Sep. 11, 1995

Related U.S. Application Data

[63] Continuation-in-part of Ser. No. 389,297, Feb. 16, 1995, Pat. No. 5,553,889, which is a continuation-in-part of Ser. No. 328,657, Oct. 25, 1994, which is a continuation-in-part of Ser. No. 210,668, Mar. 18, 1994.

[51] Int. Cl.$^6$ ............................................. B60R 21/16
[52] U.S. Cl. ............................................. 280/736; 280/737
[58] Field of Search ............................. 280/736, 737, 280/741; 222/3, 5

[56] References Cited

U.S. PATENT DOCUMENTS

| | | | |
|---|---|---|---|
| 3,117,424 | 1/1964 | Hebenstreit | 62/48 |
| 3,163,014 | 12/1964 | Wismar | 62/48 |
| 3,636,881 | 1/1972 | Godfrey | 102/103 |
| 3,655,217 | 4/1972 | Johnson | 280/150 |
| 3,690,695 | 9/1972 | Jones, Sr. | 280/150 AB |
| 3,721,456 | 4/1971 | McDonald | 280/150 |
| 3,755,311 | 8/1973 | Zimmer-Galler | 149/60 X |
| 3,756,621 | 9/1973 | Lewis et al. | 280/150 AB |
| 3,774,807 | 11/1973 | Keathley et al. | 222/3 |
| 3,788,667 | 1/1974 | Vancil | 280/150 AB |

(List continued on next page.)

FOREIGN PATENT DOCUMENTS

| | | |
|---|---|---|
| 0520104A1 | 6/1991 | European Pat. Off. . |
| 0592119A2 | 4/1994 | European Pat. Off. . |

*Primary Examiner*—Paul N. Dickson
*Attorney, Agent, or Firm*—Sheridan Ross P.C.

[57] ABSTRACT

A hybrid inflator comprises an inflator housing which contains a pressurized medium and a gas generator. The gas generator comprises a gas generator housing, a propellant contained within the gas generator housing, a gas generator inlet port which fluidly interconnects the gas generator housing and the inflator housing, and a gas generator outlet port which fluidly interconnects the gas generator housing and the air/safety bag. The inflator also includes a propellant ignition assembly interconnected with the gas generator and a valve operatively associated with the gas generator inlet port. The valve substantially inhibits flow between the inflator housing and the gas generator housing through the gas generator inlet port until a pressure within the inflator housing exceeds a pressure within the gas generator housing by a predetermined degree after the propellant ignition assembly is activated.

30 Claims, 15 Drawing Sheets

U.S. PATENT DOCUMENTS

| | | | |
|---|---|---|---|
| 3,822,895 | 7/1974 | Ochiai | 280/150 |
| 3,901,530 | 8/1975 | Radke | 280/150 AB |
| 3,948,540 | 4/1976 | Meacham | 280/150 AB |
| 3,960,390 | 6/1976 | Goetz | 280/731 |
| 3,966,225 | 6/1976 | Marlow | 280/737 |
| 3,966,226 | 6/1976 | Roth | 280/737 |
| 4,002,514 | 1/1977 | Plomer et al. | 147/36 X |
| 4,050,483 | 9/1977 | Bishop | 141/4 |
| 4,115,999 | 9/1978 | Diebold | 60/219 |
| 4,131,300 | 12/1978 | Radke et al. | 280/737 |
| 4,408,534 | 10/1983 | Araki et al. | 102/288 |
| 4,533,416 | 8/1985 | Poole | 149/35 |
| 4,798,142 | 1/1989 | Canterberry et al. | 102/290 |
| 4,938,813 | 7/1990 | Eisele et al. | 149/19.2 |
| 4,948,439 | 8/1990 | Poole et al. | 149/46 |
| 5,016,914 | 5/1991 | Faigle et al. | 280/741 |
| 5,022,674 | 6/1991 | Frantom et al. | 280/741 |
| 5,031,932 | 7/1991 | Frantom et al. | 280/741 |
| 5,060,974 | 10/1991 | Hamilton et al. | 280/736 |
| 5,062,365 | 11/1991 | Canterberry | 102/290 X |
| 5,125,684 | 6/1992 | Cartwright | 280/736 |
| 5,131,680 | 7/1992 | Coultas et al. | 280/737 |
| 5,160,163 | 11/1992 | Castagner et al. | 280/740 |
| 5,184,846 | 2/1993 | Goetz | 280/736 |
| 5,199,740 | 4/1993 | Frantom et al. | 280/736 |
| 5,230,531 | 7/1993 | Hamilton et al. | 280/737 |
| 5,263,740 | 11/1993 | Frey et al. | 280/737 |
| 5,316,600 | 5/1994 | Chan et al. | 149/19.4 |
| 5,348,344 | 9/1994 | Blumenthal et al. | 280/737 |
| 5,351,989 | 10/1994 | Popek et al. | 280/737 |
| 5,360,232 | 11/1994 | Lowe et al. | 280/741 |
| 5,411,290 | 5/1995 | Chan et al. | 290/737 |
| 5,423,570 | 6/1995 | Kort et al. | 280/736 |
| 5,429,691 | 7/1995 | Hinshaw et al. | 149/45 |
| 5,439,537 | 8/1995 | Hinshaw et al. | 149/22 |
| 5,441,302 | 2/1995 | Johnson et al. | 280/736 |
| 5,553,889 | 9/1996 | Hamilton et al. | 280/737 |

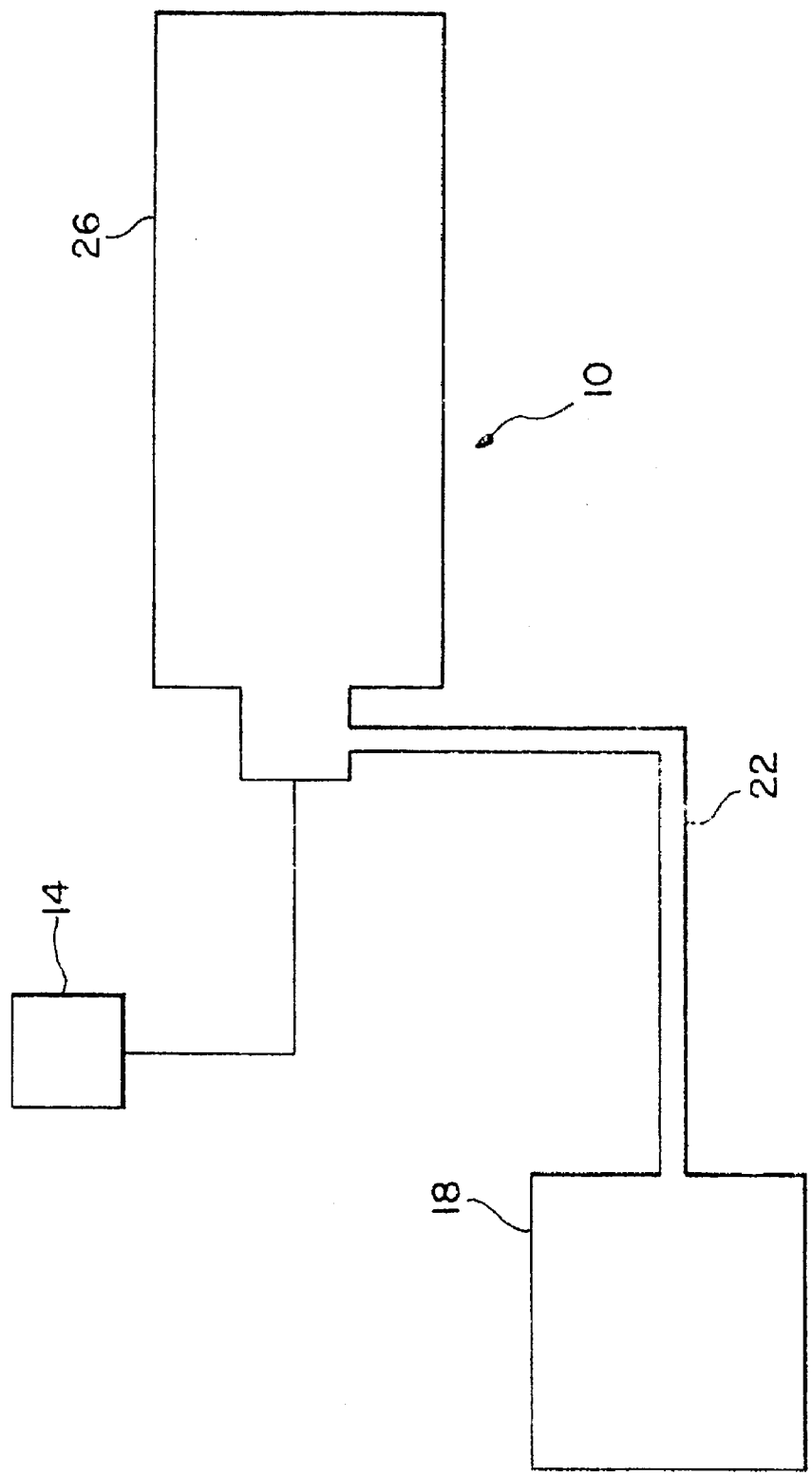

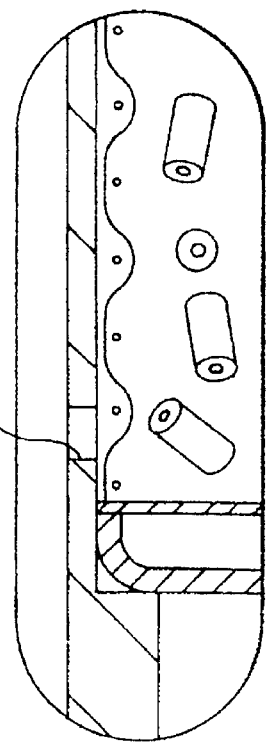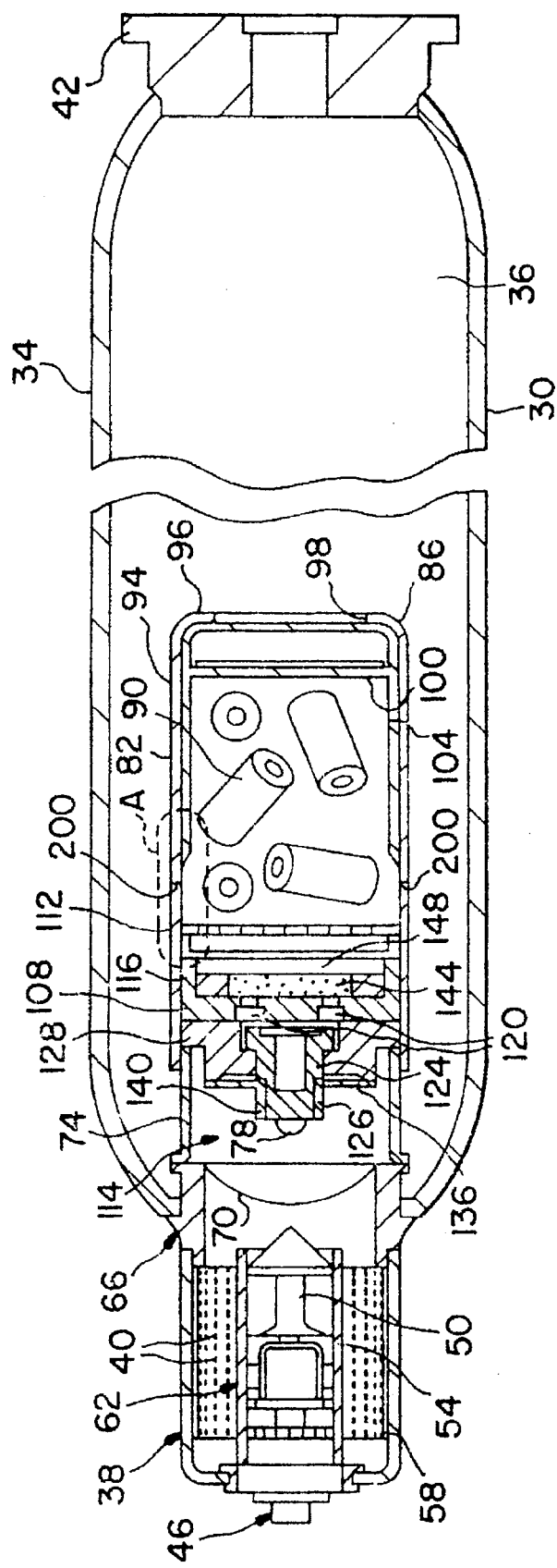
FIG.2B
FIG.2A

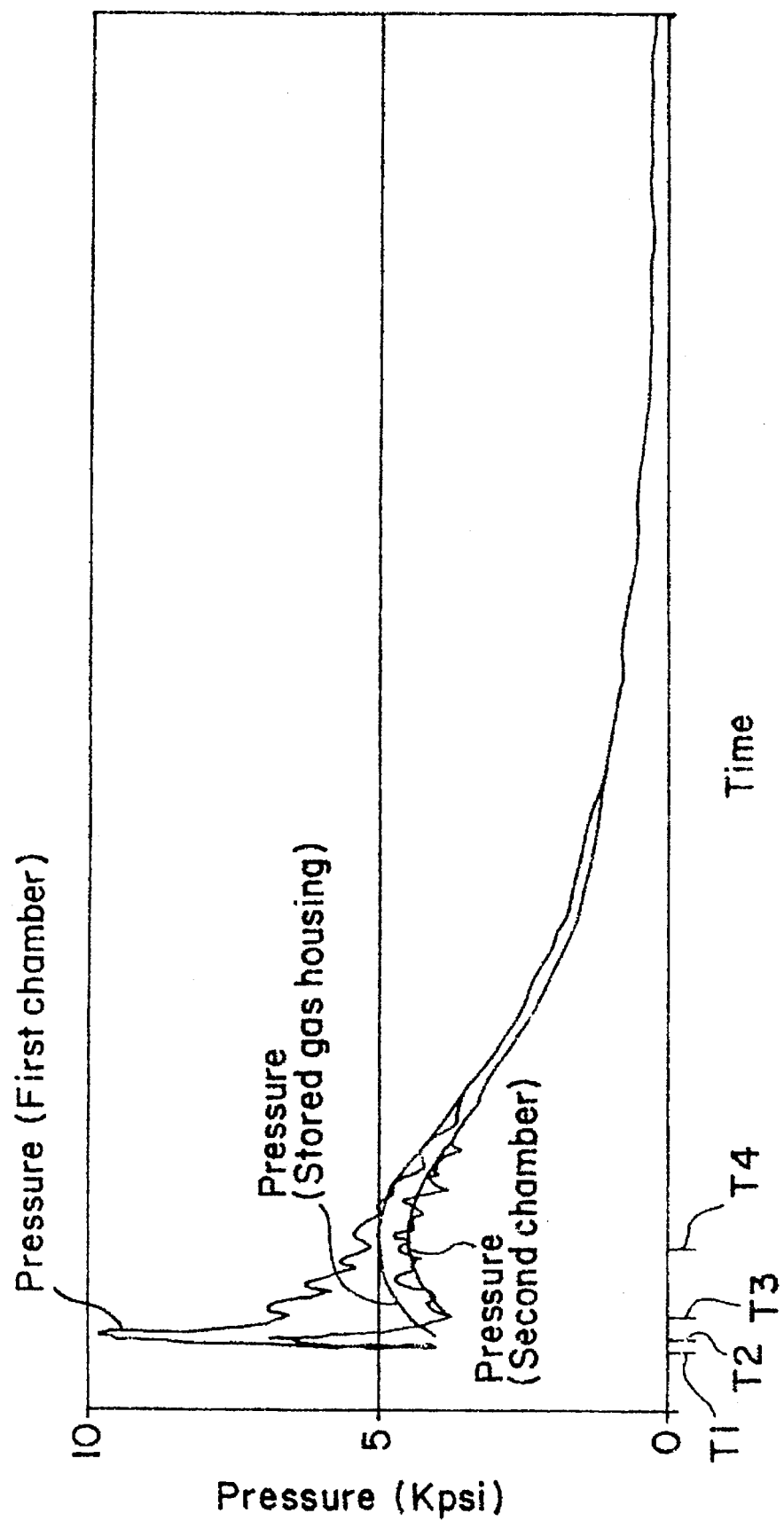

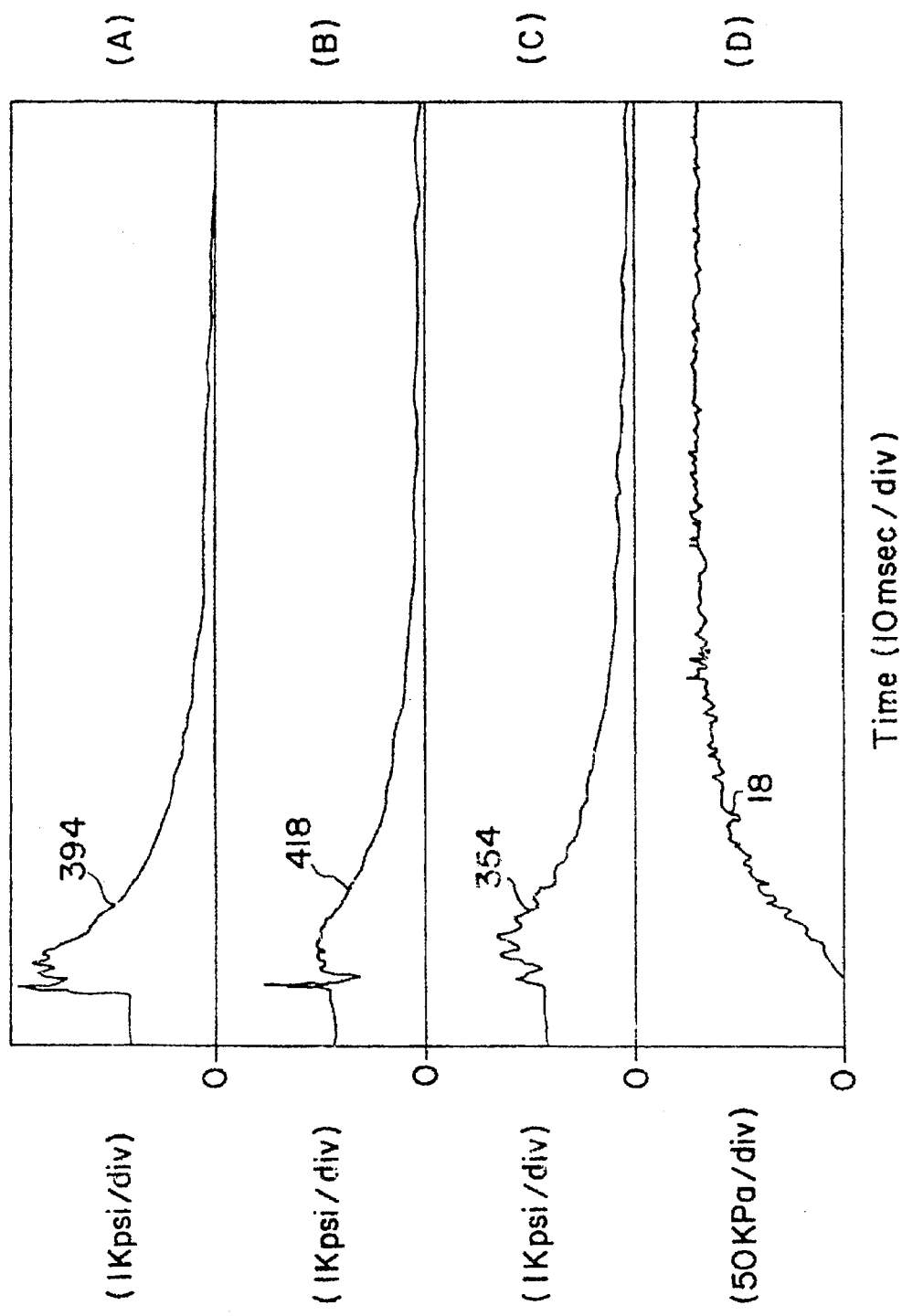

HYBRID INFLATOR WITH A VALVE

RELATED APPLICATIONS

This application is a continuation-in-part of U.S. patent application Ser. No. 08/389,297, now U.S. Pat. No. 5,553,889, entitled "Hybrid Inflator With Rapid Pressurization-Based Flow Initiation Assembly", and filed on Feb. 16, 1995, which is a continuation-in-part of U.S. patent application Ser. No. 08/328,657, entitled "Hybrid Inflator And Related Propellants", and filed Oct. 25, 1994, which is a continuation-in-part of U.S. patent application Ser. No. 08/210,668, entitled "Hybrid Inflator", and filed Mar. 18, 1994.

FIELD OF THE INVENTION

The present invention generally relates to the field of automotive inflatable safety systems and, more particularly, to a hybrid inflator which utilizes a rapid pressurization for initiating the flow to the air/safety bag.

BACKGROUND OF THE INVENTION

The evolution of inflators for automotive inflatable safety systems has resulted in the development of pressurized gas only inflators, propellant only inflators, and hybrid inflators. There are of course many design considerations for each of the above-noted types of inflators. In all three systems, two primary design considerations are that the air/safety bag must be expanded a predetermined amount in a predetermined amount of time in order to be operationally effective.

Since the weight of the automobile is an important design consideration in many instances today, so too then is the weight of the inflator. Moreover, due to the limited space available in many automotive designs, the size of the inflator is also an important design consideration.

SUMMARY OF THE INVENTION

Accordingly, it is an object of the present invention to provide a hybrid inflator which can be produced in a more compact size than conventional inflators and which can expand the air/safety bag by a predetermined amount in a predetermined amount of time.

To achieve the above object, a hybrid inflator of the present invention includes an inflator housing which contains a pressurized medium. A gas generator comprises a gas generator housing, a propellant contained within said gas generator housing, at least one gas generator inlet port which fluidly interconnects said gas generator housing and said inflator housing, and at least one gas generator outlet port which fluidly interconnects said gas generator housing and the air/safety bag. A propellant ignition assembly is interconnected with said gas generator. Valve means is operatively associated with said at least one gas generator inlet port. The valve means substantially inhibits flow between said inflator housing and said gas generator housing through said at least one gas generator inlet port until a pressure within said inflator housing exceeds a pressure within said gas generator housing by a predetermined degree after said propellant ignition assembly is activated.

BRIEF DESCRIPTION OF THE DRAWINGS

FIG. 1 is a schematic representation of an automotive inflatable safety system;

FIGS. 2A–B are longitudinal cross-sectional views of one embodiment of a hybrid inflator and an enlargement of a portion thereof, respectively;

FIG. 12 illustrates the pressure within the various chambers of the inflator of FIG. 8 during operation;

FIGS. 13A–D illustrate the pressure within the various chambers of the inflator of FIG. 8 during operation when the valve/valve system is not used;

DETAILED DESCRIPTION

Figure 3:
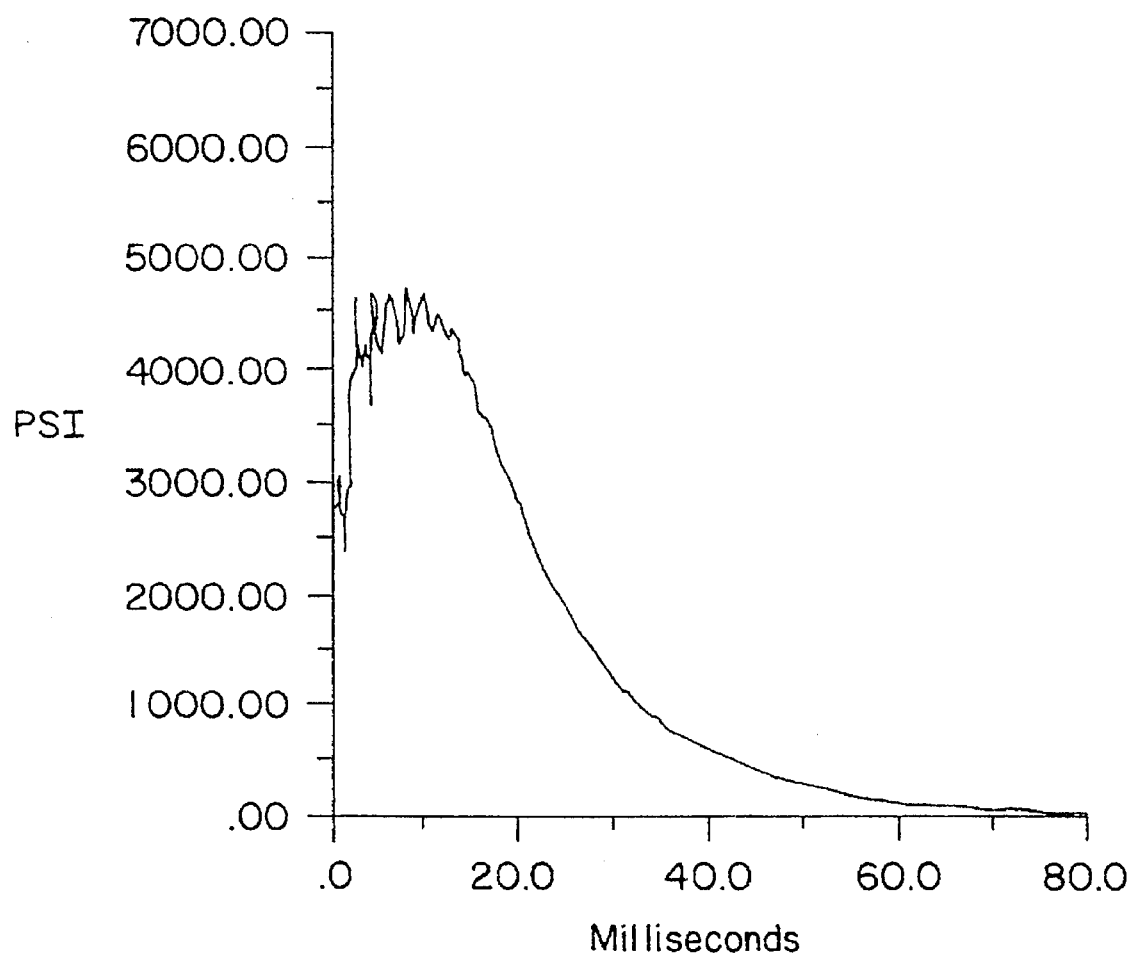
FIG. 3 is an inflator internal pressure versus time performance curve for the propellant composition of Example 2.

The present invention will be described with regard to the accompanying drawings which assist in illustrating various features of the invention. In this regard, the present invention generally relates to hybrid inflators for automotive inflatable safety systems. That is, the invention relates to an inflator which utilizes both a stored, pressurized gas and a gas and/or heat generating propellant. Various types of hybrid inflators are disclosed in U.S. Pat. No. 5,230,531 to Hamilton et al. which is assigned to the assignee of this application, and the entire disclosure of this patent is hereby incorporated by reference in its entirety herein.

One embodiment of an automotive inflatable safety system is generally illustrated in FIG. 1. The primary components of the inflatable safety system 10 include a detector 14, an inflator 26, and an air/safety bag 18. When the detector 14 senses a condition requiring expansion of the air/safety bag 18 (e.g., a predetermined deceleration), a signal is sent to the inflator 26 to release gases or other suitable fluids from the inflator 26 to the air/safety bag 18 via the conduit 22.

The inflator 30 illustrated in FIG. 2 is a hybrid inflator and may be used in the inflatable safety system 10 of FIG. 1 in place of the inflator 26. Consequently, the inflator 30 includes a bottle or inflator housing 34 having a pressurized medium 36 that is provided to the air/safety bag 18 (FIG. 1) at the appropriate time, as well as a gas generator 82 that provides propellant gases to augment the flow to the air/safety bag 18 (e.g., by providing heat to expand the pressurized medium 36 and/or generating additional gases). As will be discussed in more detail below, a gun-type propellant (e.g., a high temperature, fuel-rich propellant) may be used for the formulation of the propellant grains 90 positioned in the gas generator 82 and a mixture of at least one inert gas (e.g., argon) and oxygen may be used for the pressurized medium 36. For one or more aspects associated with the present invention, it is preferable that the pressurized medium includes from about 70% to about 92% of the inert fluid and from about 8% to about 30% of oxygen on a molar basis, and more preferably the pressurized medium includes from about 79% to about 90% of the inert fluid and from about 10% to about 21% of oxygen on a molar basis.

The inflator housing 34 and gas generator 82 are interconnected, with the gas generator 82 being positioned inside the inflator housing 34 to reduce the space required for the inflator 30. More specifically, a hollow diffuser 38 is welded to one end of a hollow boss 66 (e.g., having a diameter of about 1.25"). The diffuser 38 has a plurality of rows of discharge holes 40 (e.g., 80 discharge holes 40 each having a diameter of about 0.100") therethrough which provides a "non-thrusting output" from the inflator 30 and a screen 58 is positioned adjacent the discharge holes 40. A closure disk 70 is appropriately positioned within the boss 66 and is welded thereto in order to initially retain the pressurized medium 36 within the inflator housing 34. When release is desired, a projectile 50 having a substantially conically-shaped head is propelled through the closure disk 70. More particularly, the projectile 50 is positioned on the convex side of the closure disk 70 within a barrel 54 and is propelled by the activation of an initiator 46 when an appropriate signal is received from the detector 14 of the inflatable safety system 10 (FIG. 1). A ring 62 is provided to initially retain the projectile 50 in position prior to firing.

An orifice sleeve 74 is welded to the closure disk 70 and/or the end of the boss 66. The orifice sleeve 74 is hollow and includes a plurality of orifice ports 78 (e.g., four ports 78 each having a diameter of about 0.201") to fluidly interconnect the interior of the inflator housing 34 and the interior of the boss 66 and diffuser 38 when the closure disk 70 is ruptured by the projectile 50. Moreover, the gas generator 82, more specifically the gas generator housing 86, is welded to the orifice sleeve 74 to complete the interconnection of the inflator housing 34 and gas generator 82.

The gas generator housing 86 contains a plurality of propellant grains 90 which when ignited provide heated propellant combustion product gases for augmenting the flow to the air/safety bag 18 (FIG. 1). The propellant grains 90 are retained within the gas generator housing 86 by a propellant sleeve 94 which is separated from the gas generator inlet nozzle 98 on the end 96 of the gas generator housing 86 by a screen 104 and baffle 100. As will be discussed below, the propellant grains 90 may be formulated from a gun-type propellant and are "smokeless". Nonetheless, the grains 90 are substantially cylindrically-shaped with a single hole extending through the central portion thereof. Other propellant grain configurations may be appropriate and will depend at least in part on the particular propellant formulation being used.

A single (or multiple) gas generator inlet nozzle 98 (e.g., a single nozzle 98 having a diameter of about 0.516") is positioned on the end 96 of the gas generator housing 86 and is generally directed away from the closure disk 70. The gas generator housing 86 also includes a plurality of circumferentially spaced outlet or discharge nozzles 200 (e.g., one "row" of four nozzles 200 each having a diameter of about 0.221") on the sidewall of the housing 86. It may be desirable to vary the axial location of these nozzles 200 (they may be generally at the mid-portion of the housing 86), although operations may be enhanced by a location more proximate the outlet. Moreover, it may be desirable to vary the number of nozzles 200. With this configuration of having discharge nozzles 200 on the sidewall of the gas generator housing 86 and an inlet nozzle 98 on the end 96 of the housing 86, during combustion of the propellant grains 90 the pressurized medium 36 is drawn into the gas generator housing 86 through the inlet nozzle 98 and the mixed gases from within the gas generator housing 86 flow out of the housing 86 through the nozzles 200. Specifically, the flow of pressurized medium 36 by the sidewall of the gas generator housing 86 produces a pressure differential which draws pressurized medium 36 into the gas generator housing 86 through the inlet nozzle 98. This significantly improves upon the performance of the inflator 30 at least when certain types of propellant gases are produced as will be discussed in more detail below.

The gas generator 82 includes an ignition assembly 114 for igniting the propellant grains 90 at the appropriate time. The ignition assembly 114 is at least partially positioned within the gas generator housing 86 between the projectile 50 and propellant grains 90 and generally includes an actuation piston 124, and at least one percussion primer 120 and an ignition/booster material 144 which serve as an activator. More particularly, an actuation guide 140 engages an end portion of the orifice sleeve 74 and the interior wall of the gas generator housing 86, the actuation guide 140 thereby functioning at least in part to contain at least a portion of and guide the actuation piston 124 positioned therein. A primer holder 116 engages an end of the actuation guide 140 and houses a plurality of conventional percussion primers 120 which are positioned substantially adjacent to the ignition/booster material 144. The ignition/booster material 144 is typically retained adjacent the primers 120 by a charge cup 148. An example of an appropriate ignition/ booster material 144 is an RDX aluminum booster material having a composition of 89% RDX, 11% aluminum powder, with 0.5% hydroxypropyl-cellulose added. A retainer 108 and baffle 112 are positioned between the primer holder 116 and propellant sleeve 94. In the event that the gas generator housing 86 is attached to the orifice sleeve 74 by crimping instead of welding, the gas generator housing 86 may have a tendency to lengthen during operation. Consequently, in order to maintain a firm interaction of the foregoing components, a wave spring washer (not shown) may be positioned, for instance, between the retainer 108 and the baffle 112.

The actuation piston 124 is slidably positioned within the actuation guide 140 and includes a continuous rim projecting member 128 which is substantially aligned with the primers 120. As can be appreciated, a plurality of projecting members (not shown), could replace the substantially continuous rim projecting member 128. A belleville washer 136 is positioned between and engages a portion of both the actuation guide 140 and actuation piston 124 (via a spacer 126) to initially maintain the position of the actuation piston 124 away from the primers 120. Consequently, the potential for inadvertent engagement of the actuation piston 124 with the primers 120, which could activate the gas generator 82, is reduced. However, after the projectile 50 passes through the closure disk 70, the energy transferred to the actuation piston 124 by the projectile 50 is sufficient to overcome the belleville washer 136 such that the projecting rim 128 is able to engage the primers 120 with sufficient force to ignite at least one of such primers 120. This in turn causes ignition of the ignition/booster material 144, and thus ignition of the propellant grains 90 results.

During operation of the gas generator 82, the primers 120 may erode and thereby allow propellant gases generated by combustion of the propellant grains 90 to flow through the primers 120. Any leakage of propellant gases in this manner may adversely affect the consistency of performance of the inflator 30. These gases, however, desirably act upon the actuation piston 124 to move the piston 124 into sealing engagement with the actuation guide 140. This provides a seal for the gas generator housing 90 which substantially limits any leakage of gases therethrough. Therefore, the propellant gases desirably flow through the gas generator nozzle 98.

Summarizing the operation of the inflator 30, the detector 14 (FIG. 1) sends a signal to the initiator 46 to propel the projectile 50. The projectile 50 initially passes through the closure disk 70 to open the passageway between the inflator housing 34 and air/safety bag 18 (FIG. 1). The projectile 50 continues to advance until it impacts the actuation piston 124 which causes the projecting rim 128 attached thereto to strike at least one of the aligned primers 120. As a result, the ignition/booster charge 144 ignites, which in turn ignites the propellant grain 90. During combustion of the grains 90 within the housing 86, the pressurized medium 36 from the inflator housing 34 is drawn into the gas generator housing 86 through the inlet nozzle 98 positioned on the end 96 of the housing 86. This results from the flow of the pressurized medium 36 by the sidewall of the gas generator housing 86 which produces a pressure differential. This "drawing in" of the pressurized medium 36 promotes mixing of the propellant gases and the pressurized medium 36 within the housing 86, and as will be discussed in more detail below this is particularly desirable when oxygen is included in the pressurized medium 36 to react with propellant gases having a large content of carbon monoxide and hydrogen. Nonetheless, gases are discharged from gas generator housing 86 through the discharge nozzles 200 on the sidewall of the housing 86. As such, the flow to the air/safety bag 18 is desirably augmented (FIG. 1) by mixing of the pressurized medium 36 with the combustion products from the gas generator housing 86.

As noted above, the hybrid inflator 30 may utilize a gun-type propellant as the formulation for the propellant grains 90, and a mixture of at least one inert gas and oxygen for the pressurized medium 36. Gun-type propellants, as used herein, are high temperature, fuel-rich propellants such as single, double, or triple-base propellants, and nitramine propellants such as LOVA or HELOVA propellants. More specifically, traditional gun-type propellants are those having a combustion temperature ranging from about 2,500° K. to about 3,800° K., and typically greater than about 3,000° K., and are fuel-rich in that without excess oxygen, these propellants generate significant amounts of CO and $H_2$. The excess of fuel from these propellants typically requires additional oxygen between 5 and 25 mole percent, or sometimes even between 15 and 40 mole percent, of the stored gas to drive the reaction equilibrium to $CO_2$ and $H_2O$.

Specific "traditional" gun-type propellants which may be used for the propellant grains 90 of the hybrid inflator 30 include HPC-96, a double base, smokeless propellant having a composition, on a weight percentage basis, of about 76.6% nitrocellulose of which about 13.25% is nitrogen; about 20.0% nitroglycerin; about 0.6% ethyl centralite; about 1.5% barium nitrate; about 0.9% potassium nitrate; and about 0.4% graphite. HPC-96 is available from Hercules, Inc. in Wilmington, Del. Since this particular double-base propellant includes nitrocellulose as a major ingredient, it cannot meet current auto industry standards for long-term thermal stability, although it does produce desirable ballistic operation.

LOVA propellants (low vulnerability ammunition) and HELOVA propellants (high energy, low vulnerability ammunition) are another "traditional" gun-type propellant which may also be used for the propellant grains 90, such as a M39 LOVA propellant having a composition, on a weight percentage basis, of about 76.0% RDX (hexahydrotrinitrotriazine); about 12.0% cellulose acetate butyrate; about 4.0% nitrocellulose (12.6% nitrogen); about 7.60% acetyl triethyl citrate; and about 0.4% ethyl centralite. The M39 LOVA propellant is available from the Naval Surface Warfare Center in Indianhead, Md. and Bofors in Europe (Sweden) and generates, without excess oxygen, about 32 mole percent CO and 30 mole percent $H_2$. The LOVA and HELOVA propellants are preferred over existing double-base propellants because they pass current U.S. automotive industry thermal stability standards, whereas double-base propellants do not. However, relatively high operating pressures are required for stable combustion of LOVA and HELOVA propellants. Notwithstanding the characteristics of the HPC-96 and LOVA propellants, they do serve to illustrate at least some of the principles/features of the present invention.

Due to the performance characteristics of gun-type propellants when used as the formulation for the propellant grains 90, together with the use of oxygen as a portion of the pressurized medium 36, it is possible to reduce the amount of propellant required for the gas generator 82 compared to current designs using, for example, 20–30 grams of FN 1061-10 available from the assignee of this patent application (FN 1061-10 has a composition, on a weight percentage basis, of about 7.93% polyvinyl chloride, 7.17% dioctyl adipate, 0.05% carbon black, 0.35% stabilizer, 8.5% sodium oxalate, 75% potassium perchlorate, and about 1% lecithin). For instance, generally for gun-type propellants which may be used in the formulation of the propellant grains 90 the total grain weight may range (in passenger side applications) from about 10 grams to about 12 grams, and is preferably less than about 15 grams. In this case, it is preferable to utilize between about 150 grams and about 190 grams of pressurized medium 36 with the oxygen being between about 10% to about 30% of this medium 26 on a molar basis. More specifically, when about 169 grams of the pressurized medium 36 is utilized, with about 15% of this on a mole percentage basis being oxygen, the total weight of the propellant grains 90 may be about 10.4 grams. For driver side applications, the desired/required amount of propellant grains 90 may be about 5 grams and for a side inflator application approximately 1.5 grams.

The above-identified reduction in the amount of gun-type propellant in comparison to the above-identified FN 1061-10 propellant composition may be also expressed as a ratio of the weight of the pressurized medium 36 to the total weight of propellant grains 90. With regard to the FN 1061-10 propellant, the assignee of this application presently uses a ratio of about 7.04 for the weight of argon (i.e., the stored gas and corresponding with the pressurized medium 36 associated with the present invention) to the weight of FN 1061-10 propellant. With regard to the use of a gun-type propellant, to achieve an inflator with the same output, weight, and size as an inflator with FN 1061-10, the ratio of the weight of the pressurized medium 36 to the total weight of the propellant grains 90 ranges from about 10 to about 20, and more preferably from about 14 to about 18, and is most preferably greater than about 15. As can be appreciated, these ratios may be further increased by use of hotter propellants, which would require even less propellant. In this regard, because the output gases of gun-type propellants are essentially free of hot particulate matter, the inflator can produce output gases at a higher temperature than can a particulate-laden inflator such as current state-of-the-art hybrids. This increase in temperature will allow the inflator to be smaller and lighter still, since the hotter gas is relatively more expansive. In addition to the foregoing, generally size and weight reductions of the inflator structure may be achieved when using gun-type propellants. For instance, when using even a ratio of 7.04 for gun-type propellants in an inflator, the same output may be achieved as in the case of using the same ratio of FN 1061-10, but the inflator with the gun-type propellant may be about 50% lighter and smaller than the inflator using FN 1061-10. The ratio of 7.04 can be used equally well for driver side applications and side inflators in the noted manner.

The above-identified reduction in the amount of gun-type propellant in comparison to the above-identified FN 1061-10 propellant composition may also be expressed as a ratio of the gram moles of the total gas output (i.e., the combination of the propellant gases and the pressurized medium 36) to the total weight of the propellant grains 90. With regard to the FN 1061-10 propellant, the assignee of the application presently uses a ratio of about 0.192 gram moles/gram of propellant for the moles of the output gas to the weight of the propellant. In comparison and generally in the case of a gun-type propellant for an inflator of the same output, weight, and size, the ratio of the moles of the output gas to the total weight of the propellant grains 90 may range from about 0.35 gram moles per gram of propellant to about 0.6 gram moles per gram of propellant, more preferably from about 0.4 grammoles per gram of propellant to about 0.5 gram moles per gram of propellant, and is most preferably about 0.5 gram moles per gram of propellant. As noted above, for hybrid inflators using gun-type propellants and even using a ratio of 0.192 gram moles/gram of propellant, the inflator output is the same as a hybrid inflator using FN 1061-10, but the weight and size of the gun-type propellant hybrid inflator is reduced about 50%.

The use of multiple gases for the pressurized medium 36 allows for the use of at least a gun-type propellant formulation for the propellant grains 90. Generally, the pressurized medium 36 is composed of at least one inert gas and oxygen. Appropriate inert gases include argon, nitrogen, helium, and neon, with argon being preferred. The oxygen portion of the pressurized medium is multi-functional. Initially, the reaction of the oxygen with the gaseous combustion products of the gun-type propellant of the propellant grains 90 provides a source of heat which contributes to the expansion of the inert gas. This allows at least in part for a reduction in the amount of propellant which is required for the gas generator 82. Moreover, the reaction of the oxygen with the propellant combustion products also reduces any existing toxicity levels of the propellant gases to acceptable levels. For instance, the oxygen will convert preferably a substantial portion of existing carbon monoxide to carbon dioxide (e.g., convert at least about 85% of CO to $CO_2$) and existing hydrogen to water vapor (e.g., convert at least about 80% of the $H_2$ to $H_2O$), and a substantial portion of the unburned hydrocarbons will be similarly eliminated (e.g., eliminate at least about 75% of the hydrocarbons). As such, the performance of the gas generator 82 as discussed above is significantly improved. That is, the medium 36 and including the oxygen is drawn into the gas generator housing 86 through the inlet nozzle 98 on the end 96 of the housing 86 by the pressure differential produced by the flow of the pressurized medium 36 by the sidewall of the gas generator housing 86 having the discharge nozzles 200 thereon. As a result, there is a mixing of the medium 36 with the CO and hydrogen-rich combustion products of the gas generant which dramatically improves the overall combustion efficiency of the gas generant, the mixing of the combustion products of the gas generant with the oxygen-rich medium 36, and the burning rate of the propellant grains 90. Gases are then drawn out of the discharge nozzles 200 on the sidewall of the housing 86. The above configuration of the gas generator housing 86 thereby greatly improves upon the performance of the inflator 30 (e.g., by promoting the quick and efficient mixing of the oxygen with the propellant gases).

The amount of the at least one inert gas, on a molar basis, is generally between about 70% and about 90% and the amount of oxygen, on a molar basis, is generally between about 10% and about 30%. However, and as noted above, the pressurized medium may include from about 70% to about 92% of the inert fluid and from about 8% to about 30% of the oxygen on a molar basis. Generally, it is desirable to use an amount of oxygen in excess of that based upon theoretical conversions. However, it is also generally desirable to not have more than about 20% (molar) oxygen in the output gas (i.e., the combination of the propellant gases and the pressurized medium).

The inflator 30 may be assembled in the following manner. Initially, the gas generator 82 is assembled, such as by: 1) inserting the baffle 100 and screen 104 in the gas generator housing 86 adjacent the discharge end 96; 2) inserting the propellant sleeve 94 in the gas generator housing 86; 3) positioning the propellant grains 90 within the propellant sleeve 94; 4) inserting the baffle 112 and retainer 108 in the gas generator housing 86 adjacent the end of the propellant sleeve 94 opposite the discharge end 96 of the generator; 5) inserting the primer holder 116, with the ignition/booster material 144 and charge cup 148, in the gas generator housing 86; and 6) inserting the actuation guide 140, belleville washer 136, and actuation piston 124 into the gas generator housing 86. Thereafter, the various parts are interconnected, such as by welding the gas generator housing 86 to the orifice sleeve 74, by welding the diffuser 38 to the boss 66 after positioning the projectile 50 and initiator 46 in the diffuser 38, welding the closure disk 70 between the boss 66 and orifice sleeve 74, and welding the boss 66 to the inflator housing 34. With the above structure intact, the pressurized medium 36 may be introduced into the inflator housing 34. In this regard and in the case of multiple gases, the argon and oxygen may be separately introduced (e.g., first introduce the argon and/or other inert gases and then the oxygen or vice versa) into the inflator housing 34 through the end plug 42 which is welded to the end of the inflator housing 34, or introduced in the pre-mixed state.

The following examples further assist in the description of various features associated with the use of gun-type propellants in hybrid inflators.

EXAMPLE 1

The above-noted HPC-96 propellant was used to form the propellant grains 90 having a total weight of 18 grams. Each propellant grain 90 had the configuration generally illustrated in FIG. 2, and had a length or thickness of about 0.52 inches, an outer diameter of about 0.29 inches, and a web thickness of about 0.105 inches (one-half of the difference between the inner and outer diameters of the propellant grain 90). Moreover, the HPC-96 propellant had the following properties when ignited in the presence of air: an impetus of 363,493 ft-lbs/lb; a heat of explosion of 1,062 calories/gram;

a $T_v$ of 3490° K.; a molecular weight of the gases of 26.7 grams/mole; a specific heat ratio of 1.2196; and a solid density of 1.65 grams/cubic centimeter. The gas composition, based upon theoretical calculations of normal compositions and assuming a combustion at gun pressures expanded to atmospheric pressure, on a molar percentage basis, was: about 26.5% carbon monoxide; about 19.1% water; about 26.2% carbon dioxide; about 13.7% nitrogen; about 14.2% hydrogen; and about 0.3% other gases.

When the propellant grains 90 of HPC-96 were subjected to the industry standard Taliani thermal stability test at a temperature of 120° C., the grains 90 began to discolor within about 40 minutes and ignited within about 5 hours. This reduces the desirability of using the HPC-96 propellant for the propellant grains 90 since one current industry standard requires that a propellant for an inflatable safety system does not degrade substantially when exposed to a temperature of 107° C. for a period of 400 hours, and that the propellant thereafter ignite when exposed to its autoignition temperature. However, the HPC-96 propellant does illustrate certain principles of the present invention and is thus included herein.

With regard to HPC-96 propellant grains 90, about 169 grams of the pressurized medium 36 was provided to the inflator housing 34 and consisted, on a molar percentage basis, of about 5% oxygen and about 95% argon. The inflator 30 had four orifice ports 78 on the orifice sleeve 74 with each having a diameter of about 0.266", and the gas generator nozzle 98 had a diameter of about 0.469". No discharge nozzles 200 were provided on the sidewall of the gas generator housing 86. As such, no pressurized medium 36 was drawn into the gas generator 82 during operation and all discharge was through the nozzle 98.

Figure 4:
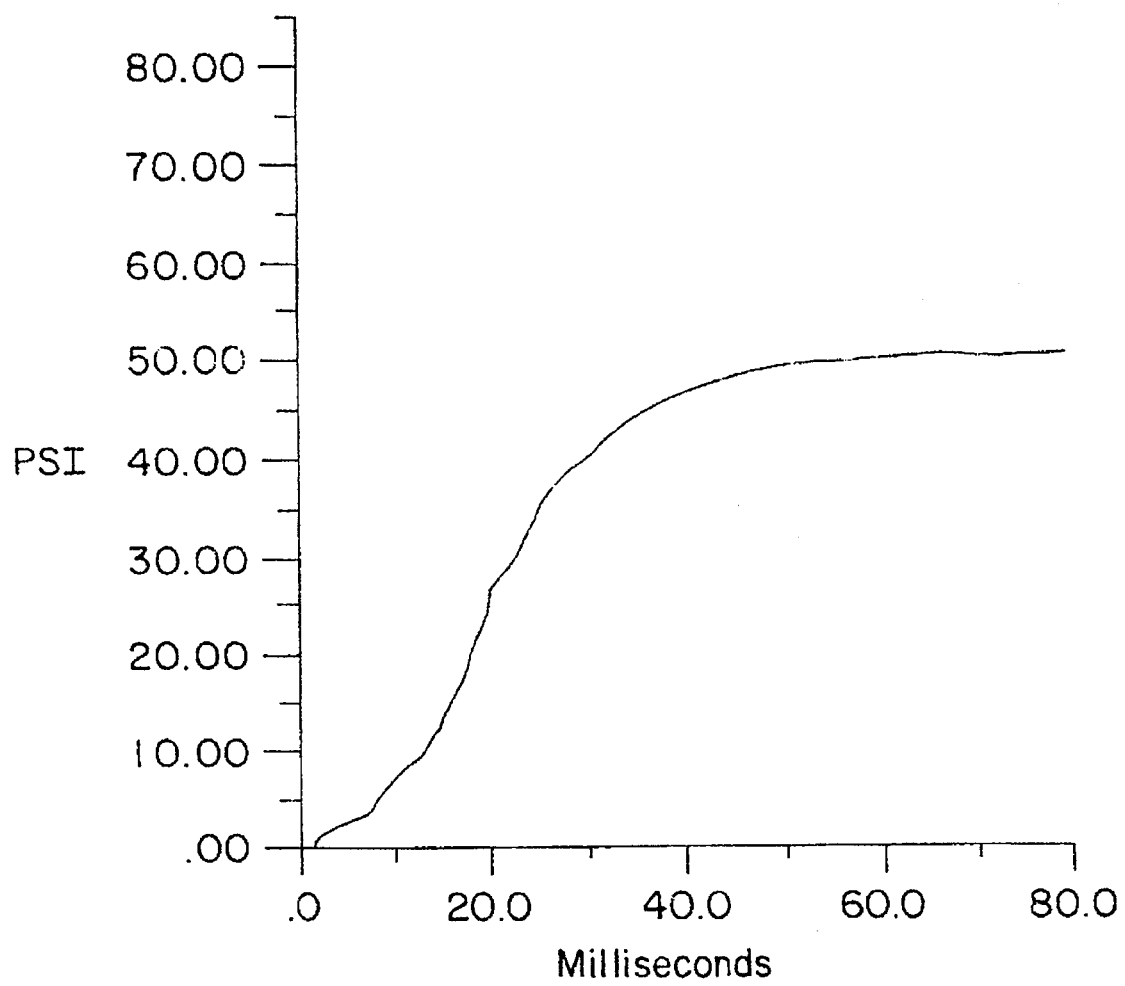
FIG. 4 is a receiving tank pressure versus time performance curve for the propellant composition of Example 2.

The pressure variation within the inflator housing 34 during operation of the inflator 30 was similar to that presented in FIG. 3, and the pressure within a 100 liter tank fluidly interconnected with the inflator 30 was similar to that illustrated in FIG. 4 and is generally representative of the pressure buildup within the air/safety bag 18. The gaseous output from the inflator 30 included, on a weight percentage basis, about 1.2% carbon monoxide, about 1.5% carbon dioxide, greater than about 2% hydrogen, and about 60 ppm of $NO_x$. Consequently, the use of argon and oxygen in the noted proportions significantly reduced the amount of carbon monoxide and hydrogen when compared to the theoretical gaseous output of the HPC-96 propellant noted above. In this example, the radial holes were not used, and only a single gas generator outlet was used.

EXAMPLE 2

The procedure of Example 1 was repeated but 10.4 grams of HPC-96 propellant was used for the grains 90 and about 164.4 grams of a pressurized medium 36 was used with the composition being, on a molar percentage basis, about 15% oxygen and about 85% argon. The performance curves for the inflator 30 when actuated with these propellant grains 90 are illustrated in FIGS. 3 and 4 and the inflator 30 was configured in the manner discussed in Example 1. Moreover, the gaseous output from the inflator 30 included, on a molar percentage basis, about 2.4% carbon dioxide, about 1000 ppm carbon monoxide, about 70 ppm $NO_x$, about 38 ppm $NO_2$, and about 0 ppm of hydrogen. Consequently, with the increase in the amount of oxygen to 15% from the 5% of Example 1, the amount of carbon monoxide was significantly reduced without an appreciable increase in NO and $NO_2$. Moreover, this also allowed for the use of significantly less propellant.

EXAMPLE 3

The procedure of Example 1 was repeated twice using 10.4 grams of HPC 96 and 169.0 grams of pressurized medium 36 composed, on a molar percentage basis, of about 15% oxygen and about 85% argon. The performance curves for the inflator 30 were similar to those presented in FIGS. 3–4 and the inflator 30 was configured in the manner discussed in Example 1. Moreover, the gaseous output from the inflator 30 included about 1000 ppm and 800 ppm carbon monoxide, respectively, about 1.0% and 1.2% carbon dioxide, respectively, about 60 ppm and 50 ppm $NO_x$, respectively, and about 23 ppm and 20 ppm $NO_2$, respectively. Consequently, the increase in the amount of oxygen to 15% and the reduction of the amount of HPC 96 reduced the amount of carbon monoxide without an appreciable effect upon NO and $NO_2$. Moreover, the increased amount of oxygen allowed for the use of less propellant.

As noted above, two existing "traditional" gun-type propellants were initially considered for this application—conventional double-base gun propellants and low vulnerability nitramine (LOVA) gun propellants. With conventional double-base gun propellants, the system performs as expected, but will not pass industry standards for long-term storage (e.g., 400 hours at 107° C.). With LOVA gun propellants, the system performance was determined to be unsatisfactory unless the propellant is burned at a very high pressure (e.g., above 9,000 psi), which adds weight, cost, and complexity to the design. Generally, it is desirable for operating pressures of no more than about 4,000 psi to be utilized for the inflator. Because no existing propellant is satisfactory for this application under these conditions, a new propellant formulation was developed which constitutes a new class of propellant—a propellant which combines the ballistic properties of double base propellants (ignites and burns well at low pressure) with the storage properties of nitramine LOVA propellants (performs well after storage at 107° C. for 400 hours). This class of propellants will be referred to as a hybrid propellant.

Thermally stable gun-type propellants, unlike nitrocellulose-based propellants like HPC-96, when used as the formulation for the propellant grains 90 include a secondary explosive, namely a nitramine (RDX) in the case of the LOVA propellants. Other appropriate secondary explosives which may be used in the formulation of the propellant grains 90 include another nitramine, namely HMX (cyclotetramethylenetetranitramine), as well as PETN (pentaerythritol tetranitrate) and TAGN (triaminoguanidine nitrate). Table 1 below provides certain combustion properties for the RDX, HMX, and PETN secondary explosives.

TABLE 1

| TYPE | FLAME TEMPERATURE (°K.) (at 3,000 psi) | COMBUSTION GASES PRODUCED w/o excess $O_2$ (mole %) |
|---|---|---|
| RDX | 3348 | 33% $N_2$ |
|  |  | 25% CO |
|  |  | 23% $H_2O$ |
|  |  | 9% $H_2$ |
|  |  | 8% $CO_2$ |
|  |  | remainder others |
| HMX | 3340 | 33% $N_2$ |
|  |  | 25% CO |
|  |  | 23% $H_2O$ |
|  |  | 9% $H_2$ |
|  |  | 8% $CO_2$ |
|  |  | remainder others |

TABLE 1-continued

| TYPE | FLAME TEMPERATURE (°K.) (at 3,000 psi) | COMBUSTION GASES PRODUCED w/o excess $O_2$ (mole %) |
| --- | --- | --- |
| PETN | 3444 | 19.5% CO |
|  |  | 17% $N_2$ |
|  |  | 3% $H_2$ |
|  |  | 30% $H_2O$ |
|  |  | 24% $CO_2$ |

Generally, in order to achieve a desired combination of certain ballistic properties and long-term thermal stability (e.g., to attempt to achieve the ballistic characteristics of a double-base propellant and the long-term aging characteristics or long-term thermal stability of a LOVA propellant), a secondary explosive may be combined with a binder system as the formulation for the propellant grains 90 (as noted above "hybrid propellants"). The phrase "binder system", as used herein, refers to one or more compounds added to the propellant which are useful for modifying the physical, chemical, and/or ballistic properties of the propellant. Useful binder systems include those which incorporate propellant additives selected from the group consisting of binders, plasticizers, stabilizers, opacifiers, and combinations thereof.

Hybrid propellants for the propellant grains 90 in the hybrid inflator 30 exhibit good ballistic properties (i.e. burn rate and combustion temperature at a relatively low operating pressure), and exhibit acceptable long-term stability (e.g., one industry test for assessing long-term thermal stability being a statistically sufficient number of samples withstanding (not igniting) exposure to a temperature of 107° C. for a period of 400 hours). Another test is inflators withstanding, without unacceptable loss of performance, (which is typically established/specified by the customer), exposures to a temperature of 100° C. for 400 hours. More particularly, propellant grains 90 formed from a hybrid propellant burn at a combustion temperature ranging from about 2,000° K. to about 3,800° K., at a rate ranging of about 0.1 inches per second (0.25 cm/sec) to about 1 inch per second (2.5 cm/sec), and at an operating pressure (the pressure within the gas generator housing 84) of about 4,000 psi (27.6 MPa) or less. More preferably, the propellant grains 90 formed from a hybrid propellant burn at a combustion temperature ranging from about 2,000° K. to about 3,800° K., at a rate ranging from about 0.3 inches per second (0.76 cm/sec) to about 0.5 inches per second (1.26 cm/sec), and at an operating pressure of about 4,000 psi (27.6 MPa) or less.

In general, the hybrid propellant formulations comprise from about 50 wt % to about 90 wt % of a secondary explosive and from about 10 wt % to about 50 wt % of a binder system. More typically, these propellant formulations include from about 60 wt % to about 80 wt % of a secondary explosive and from about 20 wt % to about 40 wt % of a binder system. Preferably, the propellant formulation includes from about 70 wt % to about 80 wt % of a particular secondary explosive and from about 20 wt % to about 30 wt % of a binder system. Other additives and unavoidable impurities can also be present in these propellant compositions in minute amounts (i.e., in amounts less than about 5 wt % of the composition).

Typically, a resinous binder will be part of the binder system for a hybrid propellant formulation for the propellant grains 90. Nearly any type of binder soluble in common solvents (i.e. acetone, lower alcohols, etc.) can be used. However, it is generally desirable that the binder be an active or energetic compound. That is, it is desirable for the binder to be one which is easily combustible at the above-noted desired combustion temperatures and operating pressures. Furthermore, when using a binder in combination with a plasticizer, it is of course desirable that the binder be compatible with the plasticizer. Typical binders suitable for use in the propellant compositions include, but are not limited to, CA (cellulose acetate), CAB (cellulose acetate butyrate), EC (ethyl cellulose), and PVA (polyvinyl acetate). Other binders which may be appropriate for use in one or more aspects associated with the present invention include CAP (cellulose acetate propionate), azide polymer, polybutadien, polybutadienhydride, polyurethan and the combination thereof. The noted azide polymer is one of a homopolymer and copolymer comprising a monomer selected from the group consisting of GA (glycidyl azide) monomer, BAMO (3,3-bis(azidemethyl)oxetane)) monomer, and AMMO (azidemethyl methyloxetane) monomer. Moreover, GAP (an energetic glycidyl azide polymer) may be utilized as a binder component and such burns substantially more vigorously than CA. As such, it may be desirable to utilize only GAP as the binder with a secondary explosive. However, due to the significant differences in cost currently between GAP and CA, a hybrid propellant formulation may include both GAP and CA binder components.

Plasticizers can also be part of the binder system for the hybrid propellant formulation for the propellant grains 90. As noted, the plasticizer should be compatible with the binder. Moreover, it is generally desirable to use a binder system which is extrudable. Furthermore, at least for certain secondary explosives (e.g., nitramines) it is desirable to use energetic plasticizers, that is plasticizers that are capable of stable combustion within the above-noted operating temperatures and pressures. Useful energetic plasticizers include, but are not limited to, those selected from the group consisting of nitrate ester plasticizers such as TMETN (trimethylolethane trinitrate), BTTN (butanetriol trinitrate), and TEGDN (triethyleneglycol dinitrate) and glycidyl azide plasticizer and other compounds such as NG (nitroglycerin), and BDNPA/F (bis(2,2-dinitropropyl) acetal/formal). Another plasticizer that may be appropriate for one or more aspects associated with the present invention includes ATEC (acetyl triethyl citrate).

Stabilizers may also be included in the binder system for the hybrid propellant formulation for the propellant grains 90. For instance, certain binders and/or plasticizers such as the above-noted nitrate ester plasticizers will decompose upon exposure to certain temperatures, and may affect ignition of the propellant grains 90 (i.e., upon exposure to certain temperatures the nitrate ester plasticizer will thermally decompose to the degree where ignition occurs). Consequently, stabilizers may be included in the hybrid propellant formulation which will "react" with the thermally decomposing binder and/or plasticizer to maintain stability (e.g., reduce the potential for premature ignition of the propellant) and thereby enhance the long-term stability of the hybrid propellant formulation. For instance, in the case of a nitrate ester plasticizer, useful stabilizers for the propellant formulation include those which are active materials, yet are nitrate acceptors. Suitable stabilizers include, but are not limited to, ethyl centralite (symdiethyldiphenylurea), DPA (diphenylamine), and resorcinol.

One hybrid propellant formulation which has the desired ballistic properties and which has provided sufficient indications of suitable long-term stability include the combination of the nitramine secondary explosive RDX (hexahydrotrinitrotriazine) with a binder system including the binder CA (cellulose acetate), the plasticizer TMETN (trimethylolethane trinitrate), and the stabilizer EC (ethyl centralite). Generally, this hybrid propellant formulation may comprise at least about 70 wt % RDX, from about 5 wt % to about 15 wt % CA, from about 5 wt % to about 15 wt % TMETN, and no more than about 2 wt % EC. These general relative amounts provide the desired ballistic and long-term aging properties for the hybrid propellant. However, it will be appreciated that if propellant grains 90 are to be formed by extrusion from this formulation, refinements of the relative amounts within the noted ranges may be necessary.

For one or more aspects associated with the present invention, the propellant may comprise about 70 wt % RDX (hexahydrotrinitrotriazine), from about 5 wt % to about 15 wt % CA (cellulose acetate), and one of GAP (glycidyl azide polymer) and ATEC (acetyl triethyl citrate) ranging from about 5 wt % to about 15 wt %. In a case where the binder system includes the mixture of a binder, a plasticizer and a stabilizer, the ratio of each agent in the mixture is preferably from about 5 to about 30 wt %, from zero to about 20 wt % and from 0 to 5 wt % in order.

Another hybrid propellant formulation which has the desired ballistic properties and which has provided sufficient indications of suitable long-term stability includes the nitramine secondary explosive RDX with a binder system including the binders CA and GAP (glycidyl azide polymer), and a suitable plasticizer (e.g., GAP plasticizer, TMETN, ATEC and combinations thereof). Generally, this hybrid propellant formulation may comprise from at least about 70 wt % and typically between about 70 wt % and 80% RDX, from about 5 wt % to about 15 wt % CA, and from about 5 wt % to about 15 wt % GAP, and about 5 wt % to 15 wt % plasticizer. These general relative amounts provide the desired ballistic and long-term aging properties for the hybrid propellant. However, it will be appreciated that if propellant grains 90 are to be formed by extrusion from this formulation, refinements of the relative amounts within the noted ranges may be necessary.

In the case of hybrid propellants disclosed herein, as in the case of the double-base and LOVA propellants discussed above, during combustion significant quantities of carbon monoxide and hydrogen are produced (e.g., 35% CO and 19% $H_2$). Again, the formation of carbon monoxide and hydrogen gases through combustion of an inflator propellant would normally be unacceptable for an automotive inflatable safety system. However, when these types of hybrid propellants are used in the hybrid inflator 30 and as noted above, the pressurized medium 36 includes oxygen such that a substantial portion of the carbon monoxide and hydrogen (e.g., 95%) are converted during combustion or as part of a post-combustion reaction to harmless carbon dioxide and water vapor. The use of stored oxygen gas is particularly desirable because it obviates the need to include an oxygen source (e.g., potassium perchlorate) in the hybrid propellant formulation. Moreover, the highly exothermic reaction between the produced combustion gases of the propellant with the stored oxygen is particularly desirable because it enhances the heating value of the propellant, thereby minimizing the amount of propellant required for expanding the air/safety bag.

The hybrid propellants, when formulated into the propellant grains 90 and incorporated into the hybrid inflator 30, may be used in the amounts specified above with regard to the gun-type propellants and specifically including the particulars presented above with regard to the relative amounts of propellant grains 90 and pressurized medium 36. Moreover, the relative amounts of oxygen and the one inert gas for the pressurized medium 36 may also be used in the case of the hybrid propellants disclosed herein.

The following examples further assist in illustrating pertinent features of hybrid propellant formulations which include a secondary explosive and a binder system. As previously noted, all references to "wt %" refers to weight percentage.

EXAMPLE 4

A hybrid propellant composition comprising at least about 70 wt % RDX (hexahydrotrinitrotriazine), from about 5 wt % to about 15 wt % CA (cellulose acetate), from about 5 wt % to about 15 wt % TMETN (trimethylolethane trinitrate) and no more than about 2 wt % ethyl centralite was prepared and formed into cylindrical grains having an average density of about 1.7132 g/cc. A 10 g test sample was placed into a heavywall bomb chamber and fired into a tank. The test sample had a combustion temperature of about 2578° K. and exhibited acceptable ballistic properties (i.e., a burn rate of 0.47 inches per second (1.18 cm/sec) at 4000 psi (27.6 MPa)). Generally, the performance curves generally approximated those presented in FIGS. 3–4. The gas produced contained about 36% carbon monoxide, about 24% nitrogen, about 19% hydrogen, about 16% water vapor and about 5% carbon dioxide. Long-term thermal stability of the composition was assessed and determined to be acceptable (e.g., the propellant itself was exposed to a temperature of 107° C. for 400 hours and did not ignite; the propellant when contained within a hybrid inflator did not ignite when exposed to a temperature of 107° C. for 400 hours, and thereafter upon activation of the same, the performance of the inflator was substantially unaffected by the heat treatment).

EXAMPLE 5

A propellant composition comprising at least about 70 wt % RDX (hexahydrotrinitrotriazine), from about 5 wt % to about 15 wt % cellulose acetate, and from about 5 wt % to about 15 wt % GAP (glycidyl azide polymer) was prepared and formed into cylindrical grains having an average density of about 1.6857 g/cc. A 10 g test sample was placed into a heavywall bomb chamber and fired into a tank. The test sample had a combustion temperature of about 2,357° K. and exhibited acceptable ballistic properties (i.e., a burn rate of 0.48 inches per second (1.18 cm/sec) at 4,000 psi (27.6 MPa)). Generally, the performance curves generally approximated those presented in FIGS. 3–4. The exhaust gas produced contained about 37% carbon monoxide, about 25% hydrogen, about 25% nitrogen, about 10% water vapor and about 3% carbon dioxide. Long term thermal stability of the composition was assessed and determined to be acceptable (e.g., the propellant itself was exposed to a temperature of 107° C. for 400 hours and did not ignite; the propellant when contained within a hybrid inflator did not ignite when exposed to a temperature of 107° C. for 400 hours, and thereafter upon activation of the same, the performance of the inflator was substantially unaffected by the heat treatment).

Another characterization of a propellant which may be used in one or more aspects associated the present invention comprises hexogen (RDX) ranging from about 1 to 99 parts by weight, octogen (HMX) ranging from about 1 to 99 parts by weight, and a binder mixed with 100 parts by weight of the sum of hexogen and octogen. The binder ranges from 5 to 50 parts by weight. Preferably, the noted propellant comprises the hexogen (RDX) ranging from 80 to 95 parts by weight and the octogen (HMX) ranging from about 5 to 20 parts by weight.

The above-noted propellant may be used in a hybrid inflator, such as those described herein. Again, a hybrid inflator generally comprises a pressurized gas chamber containing a pressurized fluid, a gas generating chamber containing the propellant, an igniter assembly, and a rupture disk. The pressurized fluid substantially consists of an inert fluid and oxygen. The propellant is ignited by the igniter assembly when, for instance, a certain magnitude of deceleration occurs, and is burnt to generate gaseous products, (e.g., carbon monoxide and hydrogen), which are reactive with oxygen. Carbon monoxide and hydrogen react with oxygen in the pressurized gas to generate carbon monoxide and a water vapor, while increasing the pressure in the gas generating chamber. Then, the rupture disk is opened to supply the carbon dioxide, water vapor and inert gas to the air/safety bag 18 (FIG. 1). This causes the air/safety bag 18 (FIG. 1) to be inflated.

The above-noted propellant again comprises hexogen (RDX), octogen (HMX) and a binder. The contents of RDX and HMX range from 1 to 99 parts by weight and from 1 to 99 parts by weight, respectively. Preferably, the contents of RDX and HMX range from 80 to 95 parts by weight and 5 to 20 parts by weight, respectively. A binder is mixed with 100 parts by weight of the sum of hexogen and octogen and ranges form 5 to 50 parts by weight.

Typical binders suitable for use with the above-noted propellant include, but are not limited to, polyurethanes (PU), cellulose derivatives such as ethyl cellulose (EC), cellulose acetate butyrate (CAB), cellulose acetate propionate (CAP), polybutadiens such as hydroxy-terminated polybutadien (HTPB), glycidyl acid polymers such as glycidyl nitrate polymer (polyglyn), azide polymers such as glycidyl azide polymer (GAP), and 3-nitratemethyl-3-methyl-oxethane polymer (polynimmo). Cellulose acetate butyrate (CAB) and/or glycidyl azide polymer (GAP) are preferable.

The above-noted propellant may include an additive selected from the group consisting of a plasticizer, a stabilizer and the combination thereof. The plasticizer may be selected form the group consisting of TMETN (trimethylolethane trinitrate), BTTN (butanetriol trinitrate), TEGDN (triethylen glycol dinitrate), glycidyl azide, NG (nitroglycerin), BDNPA/F (bis(2,2-dinitropropyl) acetal/formal, and ATEC (acetyl triethyl citrate).

Stabilizers may be used as the above-noted propellant, which include ethyl centralite, diphenyl amine, resorcinol, akaldite II, amyl alcohol, urea, petroleum jelly.

The plasticizer may be preferably added in the range of 0 to 30 parts by weight to total 100 parts by weight of RDX, HMX, and binder. The content of the stabilizer may be preferably added in the range of 0 to 5 parts by weight to total 100 parts by weight of RDX, HMX and the binder. The above-noted propellant may be formed in powder, particle and pellet shapes, preferably in the pellet shape.

A number of examples of compositions of the above-noted propellant are presented below.

EXAMPLE 6

The following materials were mixed with each other and formed in pellets, then charged into a hybrid inflator, which comprises a pressurized gas chamber, a gas generating chamber, an igniter assembly, and a rupture disk. The hybrid inflator was activated. As a result, no smoke of KCL was generated.

Hexogen (RDX) . . . 68 parts by weight
Ocotgen (HMX) . . . 8 parts by weight
Cellulose Acetate Butyrate (CAB) . . . 12 parts by weight
Glycidyl azide polymer (GAP) . . . 12 parts by weight
Note: The content of the binder (CAB and GAP) to 100 parts by weight of RDX and HMX is about 16 parts by weight.

EXAMPLE 7

The following materials were mixed with each other and formed in pellets, then charged into the hybrid inflator which has the same structure as in Example 6. The hybrid inflator was activated. As a result, no smoke was generated.

Hexogen (RDX) . . . 72 parts by weight
Octogen (HMX) . . . 4 parts by weight
Cellulose Acetate Butyrate (CAB) . . . 12 parts by weight
Glycidyl azide polymer (GAP) . . . 12 parts by weight
Note: The content of the binder (CAB and GAP) to 100 parts by weight of RDX and HDX is about 32 parts by weight.

EXAMPLE 8

The following materials were mixed with each other and formed in pellets, then charged into the hybrid inflator which has the same structure as in the Example 6. The hybrid inflator was activated. As a result, no smoke was generated.

Hexogen (HMX) . . . 64 parts by weight
Octogen (HMX) . . . 12 parts by weight
Cellulose Acetate Butyrate (CAB) . . . 12 parts by weight
Glycidyl azide polymer (GAP) . . . 12 parts by weight
Note: The content of the binder (CAB and GAP) to 100 parts by weight of RDX and HMX is about 32 parts by weight.

EXAMPLE 9

The following materials were mixed with each other and formed in pellets, then charged into the hybrid inflator which has the same structure as in Example 6. The hybrid inflator was activated. As a result, no smoke was generated.

Hexogen (RDX) . . . 75 parts by weight
Octogen (HMX) . . . 1 parts by weight
Cellulose Acetate Butyrate (CAB) . . . 12 parts by weight
Glycidyl azide polymer (GAP) . . . 12 parts by weight
Note: The content of the binder (CAB and GAP) to 100 parts by weight of RDX and HMX is about 32 parts by weight.

EXAMPLE 10

The following materials were mixed with each other and formed in pellets, then charged into the hybrid inflator which has the same structure as in Example 6. The hybrid inflator was activated. As a result, no smoke was generated.

Hexogen (RDX) . . . 1 parts by weight
Octogen (HMX) . . . 75 parts by weight
Cellulose Acetate Butyrate (CAB) . . . 12 parts by weight
Glycidyl azide polymer (GAP) . . . 12 parts by weight
Note: The content of the binder (CAB and GAP) to 100 parts by weight of RDX and HMX is about 32 parts by weight.

EXAMPLE 11

The following materials were mixed with each other and formed in pellets, then charged into the hybrid inflator which has the same structure as in Example 6. The hybrid inflator was activated. As a result, no smoke was generated.

Hexogen (RDX) . . . 38 parts by weight

Octogen (HMX) . . . 38 parts by weight

Cellulose Acetate Butyrate (CAB) . . . 12 parts by weight

Glycidyl azide polymer (GAP) . . . 12 parts by weight

Note: The content of the binder (CAB and GAP) to 100 parts by weight of RDX and HMX is about 32 parts by weight.

EXAMPLE 12

The following materials were mixed with each other and formed in pellets, then charged into the hybrid inflator which has the same structure as in Example 6. The hybrid inflator was activated. As a result, no smoke was generated.

Hexogen (RDX) . . . 68 parts by weight

Octogen (HMX) . . . 8 parts by weight

Cellulose Acetate Butyrate (CAB) . . . 12 parts by weight

Glycidyl azide polymer (GAP) . . . 12 parts by weight

Ethyl centralite . . . 2 parts by weight

Note: The content of the binder (CAB and GAP) to 100 parts by weight of RDX and HMX is about 32 parts by weight.

EXAMPLE 13

The following materials were mixed with each other and formed in pellets, then charged into the hybrid inflator which has the same structure as in Example 6. The hybrid inflator was activated. As a result, no smoke was generated.

Hexogen (RDX) . . . 68 parts by weight

Octogen (HMX) . . . 8 parts by weight

Cellulose Acetate Butyrate (CAB) . . . 12 parts by weight

Glycidyl azide polymer (GAP) . . . 12 parts by weight

Trimethylolethane trinitrate . . . 20 parts by weight (TMETN)

Note: The content of the binder (CAB and GAP) to 100 parts by weight of RDX and HMX is about 32 parts by weight.

EXAMPLE 14

The following materials were mixed with each other and formed in pellets, then charged into the hybrid inflator which has the same structure as in Example 6. The hybrid inflator was activated. As a result, any smoke was not generated.

Hexogen (RDX) . . . 68 parts by weight

Octogen (HMX) . . . 8 parts by weight

Cellulose Acetate Butyrate (CAB) . . . 12 parts by weight

Glycidyl azide polymer (GAP) . . . 12 parts by weight

Ethyl centralite . . . 2 parts by weight

Trimethylolethane trinitrate . . . 20 parts by weight (TMETN)

Note: The content of the binder (CAB and GAP) to 100 parts by weight of RDX and HMX is about 32 parts by weight.

As mentioned above, the hybrid inflator, which does not generate KCl smoke when activated, can be made by use of the propellant comprising hexogen, octogen, and the binder.

Figure 5:
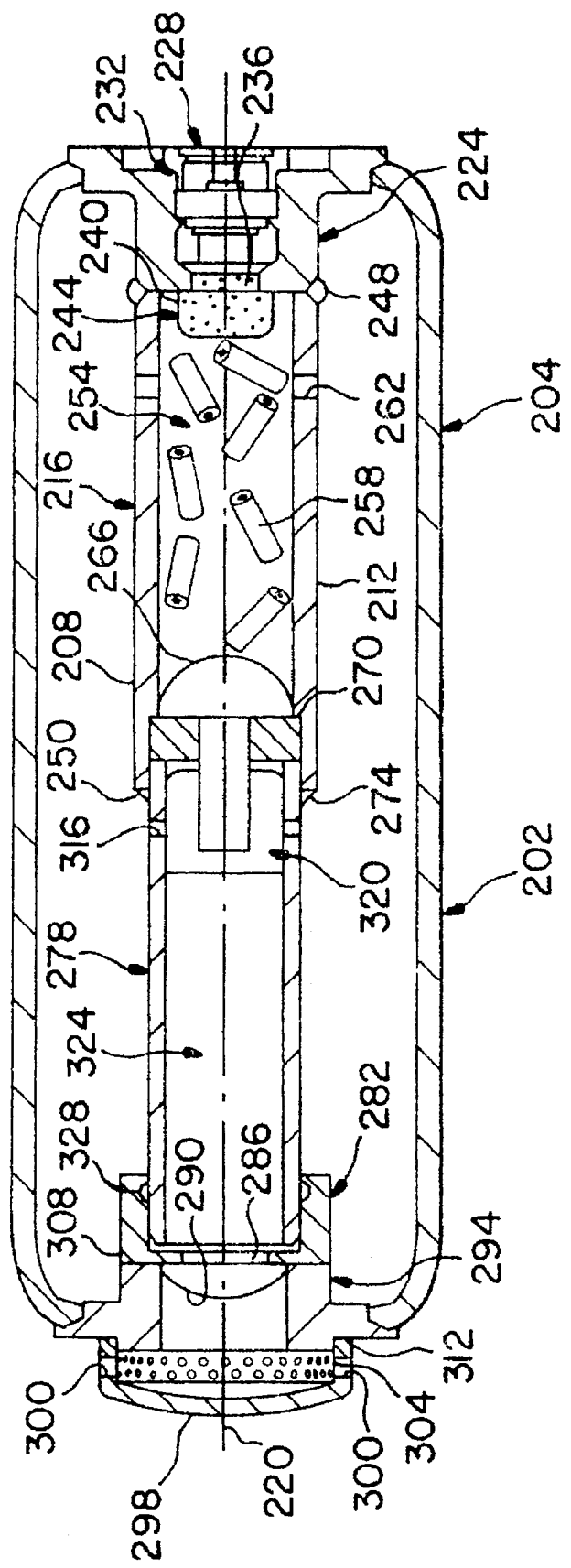
FIG. 5 is a longitudinal cross-sectional view of another embodiment of a hybrid inflator.

Another embodiment of a hybrid inflator which may be used in the inflatable safety system 10 of FIG. 1 is illustrated in FIGS. 5–7. Referring primarily to FIG. 5, the hybrid inflator 202 includes a typically cylindrical gas generator 208 and a typically cylindrical stored gas housing 204 which is concentrically positioned about the gas generator 208 and appropriately interconnected with the gas generator 208. Generally, the stored gas housing 204 (a third chamber) contains an appropriate pressurized medium and the gas generator 208 contains grains 258 of an appropriate propellant. A primary advantage of the inflator 202 is that its design affects a rapid pressurization of the region proximate the second closure disk 290 or main closure disk (which isolates the flow between the inflator 202 and the air/safety bag 18 (FIG. 1)), since that fluid pressure acts directly on the second closure disk 290 to "open" the same. Another significant advantage of the design of the inflator 202 is that it provides/ allows for sufficient "mixing" of the propellant gases generated upon ignition and combustion of the propellant grains 258 with the pressurized medium. Consequently, the inflator 202 is particularly suited for use with the above-described compositions of gun type propellants and/or hybrid propellants, together with a multi component pressurized medium (e.g., one component being oxygen and the other component being at least one inert gas). That is, the design of the inflator 202 provides/allows for effective combustion of the propellant gases and/or gases generated by igniting the propellant grains 258 (e.g., gases generated by combustion of the ignition/booster material 240 as discussed below) with the pressurized medium to enhance operation of the inflatable safety system 10 (FIG. 1). This secondary combustion further enhances the rapid pressurization abilities of the inflator 202 for initiating flow to the air/safety bag (FIG. 1).

The gas generator 208 includes a cylindrical gas generator housing 212 which in the illustrated embodiment is defined by a first housing 216 and an axially aligned and interconnected second housing 278. One end of the first housing 216 is attached to an initiator adapter 224 (e.g., via welding at weld 248) to achieve a preferably hermetic seal since the entirety of the gas generator housing 212 contains a quantity of pressurized medium in the static state. The initiator adapter 224 retains an appropriate initiator 228 (e.g., an electrically activatable squib or other suitable pyrotechnic device) which is used to ignite the propellant grains 258 and which may be seated within an o-ring 232 to establish an appropriate seal. In order to isolate the initiator 228 from the pressurized medium within the gas generator 208, a first closure disk (a secondary closure disk) 236 is appropriately secured between the end of the first housing 216 and the end of the initiator adapter 224 to achieve a preferably hermetic seal via the weld 248.

The first housing 216 of the gas generator housing 212 defines a first chamber 254 which is disposed adjacent to and in axial alignment with the initiator 228. The first chamber 254 of the gas generator housing 212 principally contains the propellant grains 258 which, when ignited, generate propellant gases to augment the flow to the air/safety bag 18 (FIG. 1). Therefore, the first chamber 254 may also be characterized as a propellant or combustion chamber. In order to assist in the ignition of the propellant grains 258, an appropriate ignition/booster material 240 (e.g., an RDX/ aluminum booster material having a composition of 89 wt % RDX, 11 wt % aluminum powder, possibly with 0.5 wt % to 5.0 wt % hydroxypropyl-cellulose added replacing 0.5 wt % to 5.0 wt % of the RDX and aluminum proportionally) may be positioned between the initiator 228 and the propellant grains 258 in alignment with the discharge from the initiator 228. As will be discussed below, the reaction products of the gases resulting from ignition of the ignition/booster material 240 may chemically react with the pressurized medium to further enhance the rapid pressurization-based flow initiation characteristics of the inflator 202. An appropriate booster cup 244 or the like retains the ignition/booster material 240 (which is typically in powder or dried slurry form) and such may be appropriately secured to the end of the inflater adapter 224 and/or the first housing 216 (e.g., by being retained between the adapter 224 and the housing 216 via the weld 248). The first chamber 254 may also include a screen 266 or the like to retain certain sized particulate matter therein while discharging propellant gases from the first chamber 254 to the second chamber 324 as discussed below. The capacity of the stored gas housing 204 of the inflator 202 is set greater than the capacity of the second chamber 324.

The first chamber 254 is fluidly interconnected with the stored gas housing 204 typically by at least one bleed orifice or port 262 (two in the illustrated embodiment) such that in the static state a quantity of pressurized medium is also contained within the first chamber 254. In the illustrated embodiment, the bleed port(s) 262 are radially extending (i.e., extending along a radius originating at the central longitudinal axis 220 and perpendicularly disposed relative to the axis 220). The use of the bleed port(s) 262 and the selection of the size and/or number of bleed ports 262 can be used to "tune" the performance of the inflator 202.

When at least one bleed port 262 is utilized, a certain amount of the flow of the propellant gases generated upon ignition of the propellant grains 258 is directed into the stored gas housing 204. When the above-noted types of propellants (e.g., gun-type, hybrid) and pressurized medium (e.g., a mixture of oxygen and an inert fluid (at least one inert gas)), some secondary combustion, namely a further combustion of the propellant gases will occur in the stored gas housing 204. Directing some of the propellant gases to the stored gas housing 204 from the first chamber 254 may be utilized to achieve a desired output or discharge to the air/safety bag 18, namely to achieve a desired rate of expansion of the air/safety bag 18. Specifically, it may be preferable to provide propellant gases to the stored gas housing 204 at a rate which maintains a substantially constant flow from the stored gas housing 204 into the second chamber 324 for a sufficient time as will be discussed below. Typically, only a minor portion of the generated propellant gases need to flow into the stored gas housing 204 during operation to affect the desired result (e.g., no more than about forty percent (40%), and more typically no more than about thirty percent (30%) of the flow of propellant gases is directed to the stored gas housing 204).

Even when the bleed ports 262 are utilized, the pressure increase in the stored gas housing 204 after ignition of the propellant grains 358 is significantly less than in many commercial hybrid designs. That is, the significant pressure increase commonly associated with ignition of the propellant grains 358 is substantially confined to the gas generator 208. Therefore, the "strength" requirements of the stored gas housing 204 may be reduced. This allows for use of a reduced wall thickness for the stored gas housing 204 and/or lighter materials, both of which decrease the weight of the inflator 202.

The principal flow of propellant gases from the first chamber 254 (e.g., at least about fifty percent (50%) of the total propellant gas flow, and typically at least about seventy percent (70%)) is to the second chamber 324 (known as the "afterburner" for reasons specified below) which is defined by the second housing 278 of the gas generator housing 212. At least one afterburner nozzle or aspirator 274 (a first interconnecting port) directs the flow from the first chamber 254 (principally propellant gases) into the second chamber 324 and thus provides the desired fluid interconnection. The afterburner nozzle 274 may be seated against a shoulder 270 on the interior of the first housing 216 and positioned therein prior to appropriately interconnecting the first housing 216 with the second housing 278 (e.g., via welding at weld 250).

In the illustrated embodiment, one end of the second housing 278 of the gas generator housing 212 is seated within an afterburner adapter 282 which has at least one gas generator outlet 286 therein. An o-ring 328 may be utilized between the second housing 278 and the adapter 282 to provide for an appropriate sealing interface. The afterburner adapter 282 is appropriately secured (e.g., via welding at weld 308) to a boss 294 which is then appropriately secured (e.g., via welding at weld 312) to the stored gas housing 204, both to preferably achieve a hermetic seal since the second chamber 324 contains a quantity of pressurized medium in the static state. In order to appropriately retain the pressurized medium within the inflator 202 until the desired time, a second closure disk 290 is positioned between the end of the afterburner adapter 282 and the boss 294 and thus retained by the weld 308.

Based upon the fluid interconnection between the first chamber 254 and the second chamber 324, propellant gases produced by combustion of the propellant grains 258, as well as gases generated by ignition of the ignition/booster material 240, are thus directed at least in part into the second (afterburner) chamber 324. Due to the rapid pressure increase therein and as controlled in the manner discussed below, the second rupture disk 290 opens at an appropriate time such that the flow from the inflator 202 is directed to the diffuser 298 and then to the air/safety bag 18 (FIG. 1). In order to provide for a relatively non-thrusting output to the air/safety bag 18 (FIG. 1), the diffuser 298 utilizes a plurality of diffuser ports 300. A diffuser screen 304 may also be contained within the diffuser 298 to retain certain particulate matter within the inflator 202 and/or to further promote mixing/reaction of the propellant gases and pressurized medium prior to passing to the air/safety bag 18 (FIG. 1).

The second chamber 324 is also fluidly interconnectable with the stored gas housing 204. In this regard, at least one and preferably a plurality of gas generator inlet ports 316 provide for a fluid interconnection between the stored gas housing 204 and the second chamber 324 such that pressurized medium from the stored gas housing 204 may flow into the second chamber 324 at the appropriate time. That is, for certain applications this particular flow can be controlled as to the direction of flow. Specifically, a valve 320 can be positioned adjacent to at least one and preferably all of the gas generator inlet ports 316. In the static state, it is not required that the valve 320 actually isolate the stored gas housing 204 from the second chamber 324 in this region. In fact, a quantity of pressurized medium is preferably retained within the second chamber 324 in the static state such that a non-sealing interface would accommodate such a supply. One configuration for the valve 320 which does not isolate the second chamber 324 from the stored gas housing 204 over the ports 316 is a substantially cylindrical roll of shim stock (e.g., 300 series stainless steel, 0.002" thick). A cantilever connection may be utilized between the valve 320 and the interior of the second housing 278. That is, a rearward portion (i.e., sufficiently distal from the ports 316) may be attached to the second housing 278 with the forward or mesial portion thereof remaining unattached and thus free to move/deflect to provide operational capabilities for the valve 320.

Based upon the foregoing, it will be appreciated that in the static state the pressure throughout the stored gas housing 204 and the gas generator housing 212 is substantially equal. However, in the dynamic state or after ignition of the propellant grains 258, the pressure throughout the various "chambers" of the inflator 202 differs to achieve a desired performance. In this regard, when the propellant grains 258 are ignited the generated propellant gases begin flowing into at least the second chamber 324 to cause a pressure increase therein. When at least one bleed port 262 is incorporated into the design, some propellant gases also flow into the stored gas housing 204 as well to initially cause a small pressure increase therein. Preferably, the pressure increases at a greater rate within the second chamber 324 than in the stored gas housing 204 due to the respective introduction of propellant gases therein and their relative volumes. This pressure differential forces the valve 320 against the interior of the aligned portion of the gas generator housing 212 or more specifically the second housing 278 and thereby temporarily isolates the stored gas housing 204 from the second chamber 324 in this region by blocking the gas generator inlet ports 316. The above-noted cantilevered interconnection of the valve 320 allows for this motion. When the pressure within the second chamber 324 reaches a predetermined level, the fluid pressure acting directly on the second closure disk 290 opens, ruptures, or breaks the disk 290. This thereby initiates flow from the gas generator 208 to the diffuser 298 and then to the air/safety bag 18 (FIG. 1).

As will be appreciated, the valve 320 allows for a timely initiation of flow to the air/safety bag 18 (FIG. 1) in certain applications. Specifically, for certain designs the use of the valve 320 allows the second chamber 324 to rapidly pressurize at a rate which will timely open the second closure disk 290. If no valve 320 was utilized in the inflator 202, propellant gases would flow into the stored gas housing 204 from the second chamber 324. As such, it could take longer for the pressure within the second chamber 324 to increase to the level where it would rupture the second closure disk 290. However, the use of the second chamber 324 provides a smaller pressurization chamber which thereby reduces the time required to initiate flow to the air/safety bag 18 (FIG. 1). As will be discussed below, in some designs the volume of the second chamber 324 can be made small enough and/or the selection of the propellant and pressurized medium may be such that the valve 320 is not required for satisfactory operation (e.g., by utilizing the combustion of the gases generated by combustion of the propellant grains 258 and/or the ignition/booster material 240 to affect a rapid pressurization within the second chamber 324).

The valve 320 retains its position and thus blocks the gas generator inlet ports 316 for a certain time after the second closure disk 290 is opened to initiate flow to the air/safety bag 18 (FIG. 1). However, once a certain pressure differential develops between the store gas housing 204 and the second chamber 324, the valve 320 is moved by the force of this pressure differential to expose the gas generator inlet ports 316. When the valve 320 is constructed in the above-described manner, the free end of the valve 320 moves radially inwardly toward the central axis 220 or by a collapsing of the valve 320 in at least those regions radially aligned with the gas generator inlet ports 316 to allow for a desired flow therethrough. However, the valve 320 is retained by its interconnection with the second housing 278. When the gas generator inlet ports 316 are exposed, flow from the stored gas housing 204 initiates into the second chamber 324. The valve 320 is movable from a first position to a second position. When the valve 320 is in the first position, the valve 320 substantially inhibits the flow when operational. The valve 320 moves to the second position and allows the flow when the pressure within the stored gas housing 204 exceeds the pressure within the gas generator housing 212 by a predetermined degree. The second position is radially inward of the first position.

The primary function of the second chamber 324, after of course the rupturing of the second closure disk 290 is achieved again by rapid pressurization of the second chamber 324, is to provide/allow for effective mixing of the propellant gases and pressurized medium prior to being discharged to the air/safety bag 18 (FIG. 1). When using the above-identified types of propellant compositions (e.g., gun-type propellants, hybrid propellants) and the above-identified type of pressurized medium (e.g., a mixture of oxygen and an inert fluid such as at least one type of inert gas), this mixing further combusts the propellant gases to provide the noted benefits (e.g., reducing toxicity, reducing the amount of propellant required for the inflator 202 by the further combustion and the related increased expansive capabilities). As such, the second chamber 324 may be further characterized as an afterburner. Preferably, at least about 99% of all combustion of the propellant gases and gases from ignition of the ignition/booster material 240, and even more preferably about 100% of such combustion occurs within the inflator 202. This reduces the potential for damage to the air/safety bag 18.

In order to fully realize the benefits of this secondary combustion, the second chamber 324 must provide/allow for sufficient mixing of the generated gases and the pressurized medium, either by length or induced turbulence as will be discussed below. In the FIG. 5 embodiment, the closest of the afterburner nozzle 274 and all gas generator inlet ports 316 to the gas generator outlet 286 should be separated therefrom by a distance of at least fifteen millimeters (15 mm) for the illustrated driver's side application. The distance can be set in the range of about 4 mm to about 80 mm for one or more aspects associated with the present invention. This increased length of the second chamber 324 also allows for a sufficient amount of pressurized medium to be contained within the second chamber 324 in the static state to react with propellant gases which are generated before the flow from the stored gas housing 204 to the second chamber 324 is initiated. That is, preferably there is sufficient pressurized medium initially contained within the second chamber 324 upon activation of the inflator 202 to react with propellant gases until the flow from the stored gas housing 204 to the second chamber 324 is initiated by the above-noted movement of the valve 320.

In order to realize the benefits of a "long" second chamber 324, the gas generator inlet ports 316 are also of course preferably disposed a sufficient distance from the gas generator outlet 286 as noted. Preferably, in order to promote further mixing of the propellant gases with the pressurized medium, the most mesial or forward portion of all gas generator inlet ports 316 (defined by their respective centerlines) should be even with the end of the afterburner nozzle 273, and is preferably more rearwardly (i.e., in a direction toward the initiator 228) and as illustrated.

The dimensions of a given design for the inflator 202 may be varied, especially, the preferable capacity range of the inflator housing 204 depends on the inflator applications as shown in Table 2. For example, the capacity of the inflator housing 204 for one or more aspects associated with the present invention may range from about 150 $cm^3$ to about 450 $cm^3$. The capacity of the first chamber 254 may range from about 10 $cm^3$ to about 40 $cm^3$. The capacity of the second chamber 324 may range from about 1 $cm^3$ to about 50 $cm^3$.

The dimensions are provided herein for one embodiment to illustrate principles of the present invention: 1) the diameter of the stored gas housing 204 is about fifty-nine millimeters (59 mm); 2) the length of the stored gas housing 204 is about two hundred millimeters (200 mm); 3) the stored gas housing 204 is formed from mild steel tubing and has a wall thickness of about two and one-half millimeters (2.5 mm); 4) the inner volume of the stored gas housing 204 (that portion in which pressurized medium is retained and not including the volume of the centrally disposed gas generator 208) is about three hundred seventy five cubic centimeters (375 cc); 5) the diameter of the first housing 216 of the gas generator housing 212 is about twenty millimeters (20 mm); 6) the length of the first chamber 254 is about fifty-five millimeters (55 mm); 7) the first housing 216 is formed from mild steel and has a wall thickness of about one and one-half millimeters (1.5 mm); 8) the inner volume of the first chamber 254 of the gas generator housing 212 is about eleven cubic centimeters (11 cc); 9) the diameter of the second housing 278 of the gas generator housing 212 is about seventeen millimeters (17 mm); 10) the length of the second chamber 324 is about ninety millimeters (90 mm); 11) the second housing 278 is formed from mild steel and has a wall thickness of about one and one-quarter millimeters (1.25 mm); 12) the inner volume of the second chamber 324 of the gas generator housing 212 is about fourteen cubic centimeters (14 cc); 13) there are six (6) bleed ports 262 each having a diameter of about three millimeters (3 mm); 14) the inner bore diameter of the afterburner nozzle 274 is about two and one-half millimeters (2.5 mm); 15) the gas generator outlet 286 has a diameter of about ten millimeters (10 mm); 16) all gas generator inlets 316 are disposed about seventy-six millimeters (76 mm) from the gas generator outlet 286; 17) the nozzle 274 is disposed about seventy-five millimeters (75 mm) from the gas generator outlet 286; 18) the inner volume of the diffuser 298 is about four cubic centimeters (4 cc); 19) there are twelve (12) diffuser ports 300; 20) the total weight of the propellant grains is about nine grams (9 g) and have a composition of the above-described type with RDX, CA, TMETN, and stabilizer; 21) the static pressure within the inflator 202 is about twenty and seven-tenths megapascals (20.7 MPa) such that there are about one hundred and forty grams (140 g) of pressurized medium, eighty-five percent (85%) of which is argon and fifteen percent (15%) of which is oxygen (mole percent); and 22) the total weight of the inflator 202 is about twelve hundred grams (1200 g). In a case where the pressurized medium includes helium for detecting the leakage of gases, the pressurized medium for one or more aspects associated with the present invention may preferably contain about 8% to about 30% oxygen, about 60% to about 91% argon and about 0.5% to about 10% helium in a molar basis.

Figure 6A:
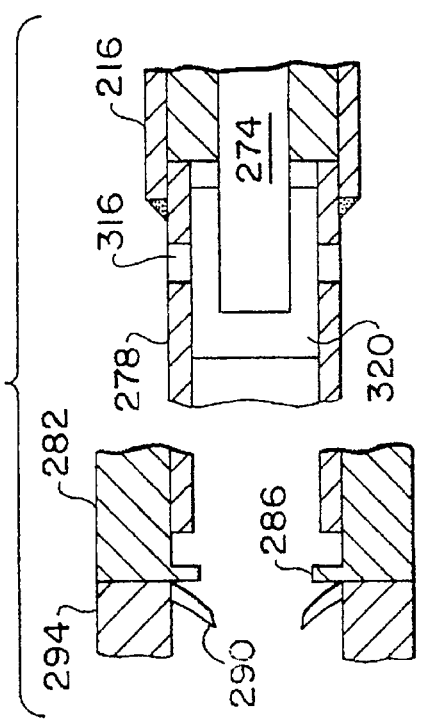
FIGS. 6A–D are enlarged, longitudinal cross-sectional views of the valve and closure disk of the inflator of FIG. 5 at different times during operation.
Figure 6B:
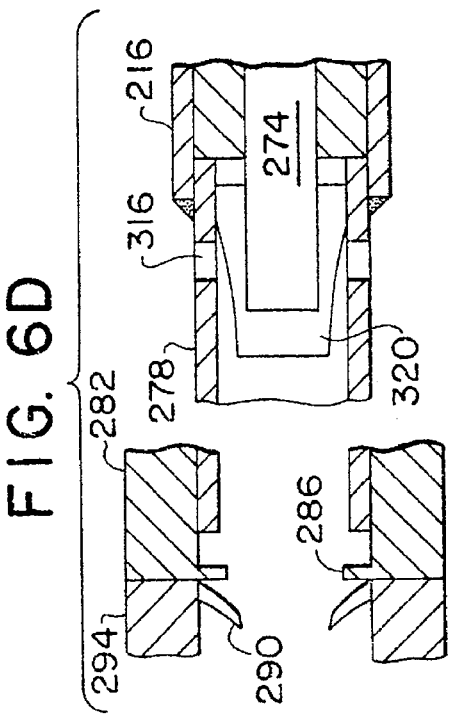
Figure 6C:
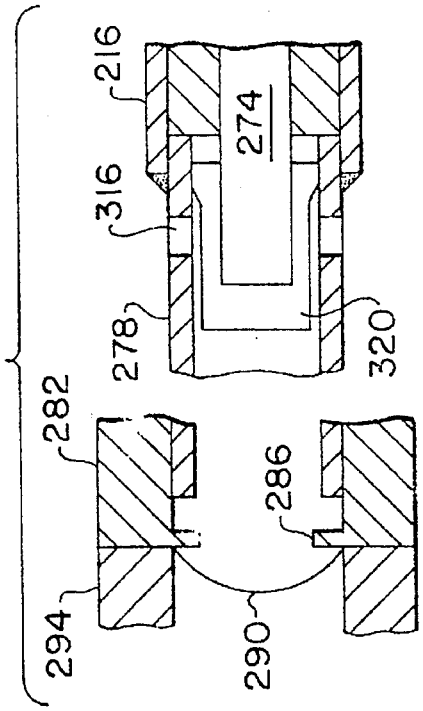
Figure 6D:
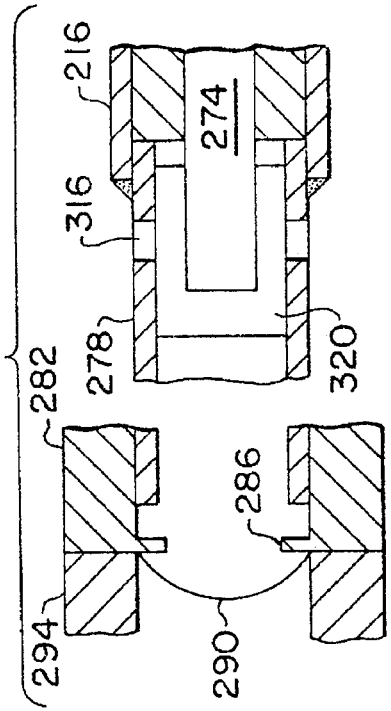
Figure 7C:
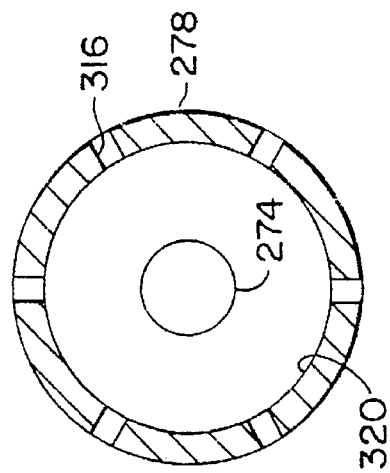
FIGS. 7A–D are end views of the valve of FIGS. 6A–D.
Figure 7D:
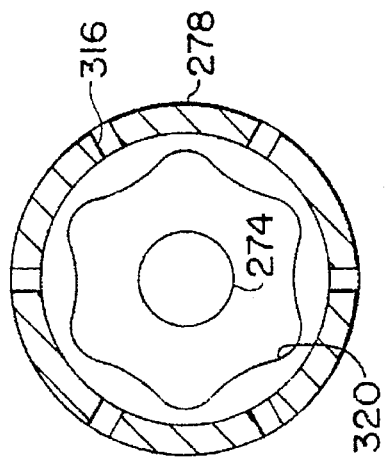
Figure 7A:
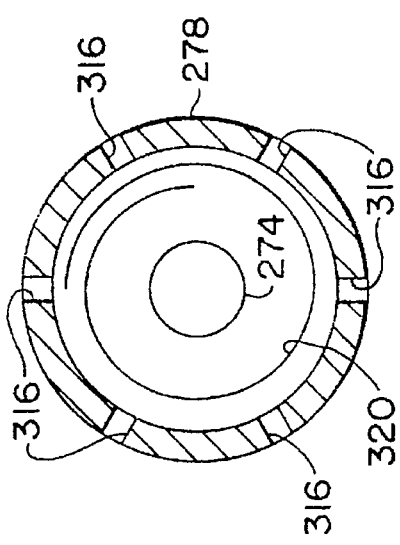

The operation of the inflator 202 will be summarized referring primarily to FIGS. 6A–D and 7A–D. In the static state, the second closure disk 290 is intact and the valve 320 does not have to isolate the stored gas housing 204 from the second chamber 324 as illustrated in FIGS. 6A and 7A. When an appropriate signal is received from the detector/sensor 14 (FIG. 1) indicating that deployment of the air/safety bag 18 (FIG. 1) is desired, the initiator 228 is activated which ruptures the first closure disk 236 and ignites the ignition/booster material 240, which in turn ignites the propellant grains 258. Combustion of the propellant grains 258 generates propellant gases within the first chamber 254 which flow into both the second chamber 324 of the gas generator housing 212 and into the stored gas housing 204. Due to the presence of the hot propellant gases within the first chamber 254 and the introduction of the hot propellant gases into both the second chamber 324 and the stored gas housing 204, the corresponding pressures within these "vessels" also increases.

Figure 7B:
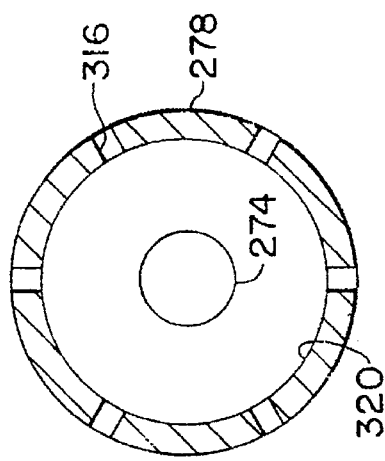

In order to rupture the second closure disk 290 at an appropriate time and thus to initiate the flow to the air/safety bag 18 (FIG. 1), the rate of pressure increase within the second chamber 324 is designed to be greater than the rate of pressure increase within the stored gas housing 214 due to the introduction of hot propellant gases therein. This pressure differential seats the valve 320 against the interior of the second housing 278 to isolate the stored gas housing 204 from the second chamber 324 in this region as illustrated in FIGS. 6B and 7B and to affect rapid pressurization of the second chamber 324. Since the supply of pressurized medium to react with the propellant gases is thus suspended, the amount of pressurized medium within the second chamber 324 in the static state should be sufficient to react with the propellant gases introduced thereto prior to establishing direct fluid communication between the stored gas housing 204 and second chamber 324.

Once the pressure within the second chamber 324 reaches a predetermined magnitude, the fluid pressure acting directly on the second closure disk 290 ruptures the second closure disk 290 as illustrated in FIG. 6C such that there is a flow through the gas generator outlet(s) 286, to the diffuser 298, and to the air/safety bag 18 (FIG. 1). However, the valve 320 may continue to impede the flow into the second chamber 324 directly from the stored gas housing 204 by blocking the gas generator inlet ports 316 as illustrated in FIGS. 6C and 7C. After a certain pressure differential develops between the stored gas housing 204 and the second chamber 324, this moves the valve 320 away from the gas generator inlet ports 316 to establish a flow of pressurized medium from the stored gas housing 204 to the second chamber 324 as illustrated in FIGS. 6D and 7D. For instance, with the illustrated structure for the valve 320 (e.g., a cylindrical roll of metal foil), the forward portion of the valve 320 collapses or moves radially inward under the noted pressure differential at least in those regions proximate or aligned with the gas generator inlet ports 316. The rearward part of the valve 320, however, remains attached to the second housing 278.

Based upon the foregoing, it is apparent that the design of the inflator 202 is particularly suited for use with and enhances the performance of a system which includes the above-described propellants (e.g., gun-type, hybrid) and pressurized medium (e.g., a mixture of oxygen and at least one inert gas). For instance, In the case where the above-noted propellants and pressurized medium are utilized, there will be a secondary combustion of the propellant gases with the pressurized medium within the second chamber 324. This additional combustion further expands the gases, which reduces the amount of propellant required and thus reduces the weight of the inflator 202. Moreover, this secondary combustion also reduces the toxicity of the propellant gases. By utilizing a "long" second chamber 324, particularly the distance between the closer of the afterburner nozzle 274 and gas generator inlet ports 316 with respect to the gas generator outlet(s) 286, there is sufficient time for this secondary combustion to occur prior to the resulting flow being provided to the air/safety bag 18 (FIG. 1).

As noted, in certain designs the inflator 202 may be generally configured as discussed above, but without utilizing the valve 320. This may be possible by utilizing the above-described types of propellants and pressurized medium, namely a propellant which generates propellant gases which may be further combusted in the second chamber 324 by mixing with an oxidizing pressurized medium (e.g., a multi-component mixture of oxygen and an inert fluid such as one or more types of inert gases). In this case, the "secondary" combustion of the propellant gases, and possibly secondary combustion of gases resulting from ignition of the ignition/booster material 240, within the second chamber 324 affects a sufficient pressure increase/ rate of increase that the valve 320 may not be required. For instance, the secondary combustion may account for at least about thirty percent (30%) of the pressure increase/rate of pressure increase within the second chamber 324 after activation of the inflator 202, and possibly up to about fifty percent (50%). As such, it is possible to achieve a rapid pressurization-based flow initiation using a chemical reaction in the second chamber 324, thereby alleviating the need for the valve 320.

Another embodiment of a hybrid inflator which may be used in the inflatable safety system 10 of FIG. 1 is illustrated in FIGS. 8–11. The inflator 350 is functionally/operationally similar to the inflator 202 discussed above, but is specifically configured for a driver's side application. As such, the inflator 350 enhances the performance of the inflatable system 10, particularly when utilizing the above-identified types of propellants (e.g., gun type propellants, hybrid propellants) and a multi-component pressurized medium (e.g., a mixture comprising oxygen and an inert fluid such as at least one inert gas).

Figure 8:
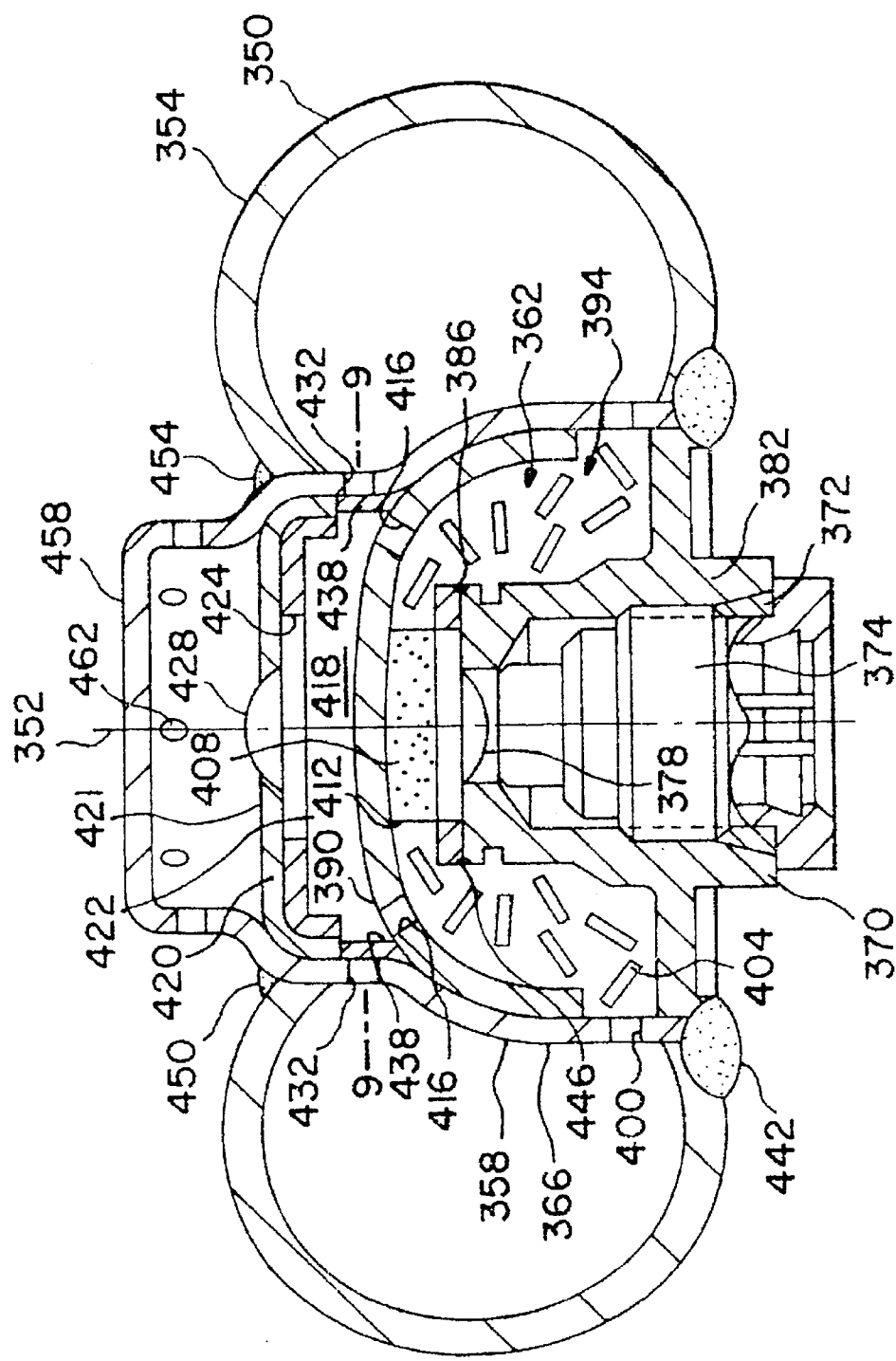
FIG. 8 is a longitudinal cross-sectional view of another embodiment of a hybrid inflator.
Figure 9:
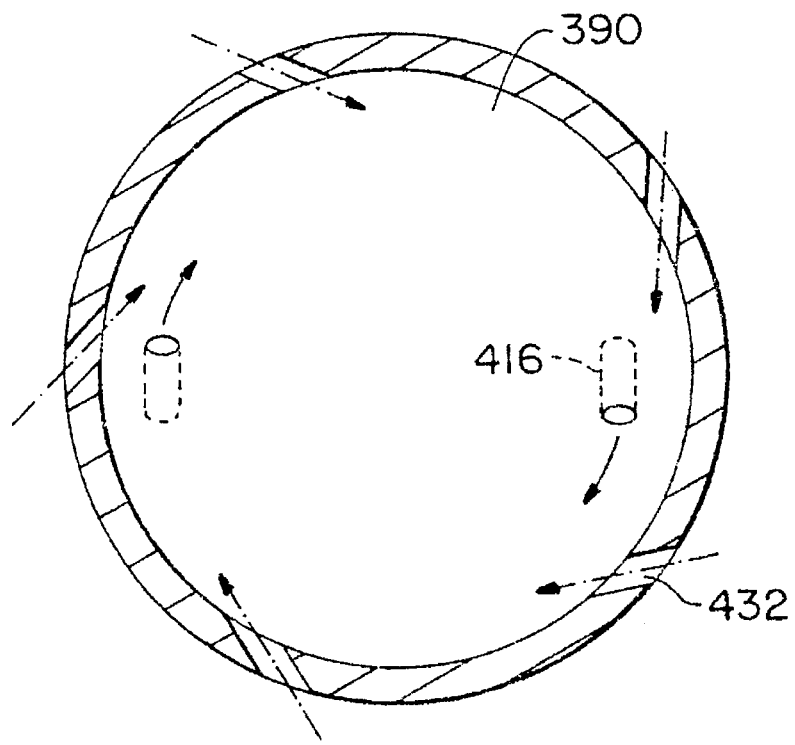
FIG. 9 is a cross-sectional view of the central housing taken along line 9—9 in FIG. 8.

Referring primarily to FIG. 8, the hybrid inflator 350 generally includes two main elements, namely a central housing 358 which includes a gas generator 362 and a diffuser 458, and a stored gas housing 354 which is circumferentially disposed about and appropriately attached to the central housing 358 (e.g., via welding at welds 442, 450), preferably to achieve a hermetic seal. The stored gas housing 354 has a toroidal configuration and contains pressurized medium. Again, a primary advantage of the inflator 350 is that it affects a rapid pressurization of the region proximate the second closure disk 428 (which isolates the flow between the inflator 350 and the air/safety bag 18 (FIG. 1)), such that fluid pressure acts directly on the second closure disk 428 to "open" the same. Moreover and as will be discussed in more detail below, another advantage of the inflator 350 is that it again concentrates the substantial pressure increase associated with activation of a hybrid primarily within the gas generator 362. Consequently, the wall thickness of the stored gas housing 354 may be reduced in comparison to conventional hybrid inflator designs (i.e., the pressure rating of the stored gas housing 354 may be reduced), which in turn reduces the weight of the inflator 350.

The central housing 358 is disposed about the central, longitudinal axis 352 of the inflator 350 and includes a gas generator 362 and a longitudinally aligned and spaced diffuser 458. Both the gas generator 362 and the diffuser 458 are defined at least in part by this central housing 358. For instance, the gas generator 362 includes a cylindrical gas generator housing 366 which is defined by a portion of the central housing 358, an ignition assembly holder 370, a domed partition 390, and a gas generator end cap assembly 420. Specifically, the ignition assembly holder 370 is appropriately connected to both a lower portion of the central housing 358 and to the stored gas housing 354 (e.g., via welding at weld 442) to achieve a preferably hermetic seal since the gas generator housing 366 also contains a quantity of the pressurized medium in the static state. The ignition assembly holder 370 retains an appropriate ignition assembly 374 (e.g., an electrically activatable squib or other suitable pyrotechnic device), and an o-ring 372 may be utilized to provide a sealing interface. In order to isolate the ignition assembly 374 from the pressurized medium within the gas generator 362, a first closure disk (a secondary closure disk) 378 is appropriately attached to the end of the ignition assembly holder 370 (e.g., by welding at weld 446) to achieve a preferably hermetic seal. In the illustrated embodiment, the first closure disk 378 is retained between an end of an ignition assembly holder main housing 382 and an ignition assembly holder end cap 386 of the ignition assembly holder 370 at the weld 446.

The partition 390 separates the gas generator housing 366 into a first chamber 394 and a second chamber 418. The first chamber 394 is defined by a lower portion of the central housing 358, the ignition assembly holder 370, and the lower surface of the partition 390, and is disposed adjacent to the ignition assembly 374. The first chamber 394 of the gas generator housing 366 principally contains the propellant grains 404 which, when ignited, generate propellant gases to augment the flow to the air/safety bag 18 (FIG. 1). Therefore, the first chamber 394 may also be characterized as a propellant chamber. In order to assist in the ignition of the propellant grains 404, an appropriate ignition/booster material 408 (e.g., an RDX/aluminum booster material having a composition of 89 wt % RDX and 11 wt % aluminum powder, possibly with 0.5 wt % to 5.0 wt % hydroxypropyl-cellulose added replacing 0.5 wt % to 5.0 wt % of the RDX and aluminum proportionally) may be positioned in a central portion of the first chamber 394 in alignment with at least a portion of the ignition assembly 374. An appropriate screen 412, booster cup or the like may separate the propellant grains 404 from the ignition/booster material 408.

The first chamber 394 is fluidly interconnected with the stored gas housing 354 typically by at least one bleed orifice or port 400 (two in the illustrated embodiment) such that in the static state pressurized medium is also contained within the first chamber 394 as noted above. In the illustrated embodiment, the bleed port(s) 400 are radially extending (i.e., extending along a radius originating at the central longitudinal axis) and in a substantially horizontal fashion (i.e., contained within a plane which is perpendicular to the central axis 352). Selection of the size and/or number of bleed port(s) 400 can be used to "tune" the performance of the inflator 350 as discussed above with regard to the inflator 202.

As will be discussed in more detail below, the reaction of the resulting gases from ignition of the ignition/booster material 408 may also chemically react with the pressurized medium to further enhance the rapid pressurization-based flow initiation characteristics of the inflator 350.

Directing some of the propellant gases to the stored gas housing 354 from the first chamber 394 may be utilized to achieve a desired output or discharge to the air/safety bag 18, namely to achieve a desired rate of expansion of the air/ safety bag 18. Specifically, it may be preferable to provide propellant gases to the stored gas housing 354 at a rate which maintains a substantially constant flow from the stored gas housing 354 into the second chamber 418 for a sufficient time as will be discussed below. Typically, only a minor portion of the generated propellant gases need to flow into the stored gas housing 354 during operation to affect the desired result (e.g., no more than about forty percent (40%), and more typically no more than about thirty percent (30%) of the flow of propellant gases is directed to the stored gas housing 354).

Even when the bleed ports 400 are utilized, the pressure increase in the stored gas housing 354 after ignition of the propellant grains 404 is significantly less than in many commercial hybrid designs. That is, the significant pressure increase commonly associated with ignition of the propellant grains 404 is substantially confined to the gas generator 362. Therefore, the "strength" requirements of the stored gas housing 354 may be reduced. This allows for use of a reduced wall thickness for the stored gas housing 354 and/or lighter materials, both of which decrease the weight of the inflator 350. For instance, the maximum required wall thickness for the stored gas housing 354 may be about 0.075" when the internal pressure in the static state is about four thousand pounds per square inch (4,000 psi) and when the housing 354 is formed from mild steel.

The principal flow of propellant gases from the first chamber 394 (e.g., at least about fifty percent (50%) of the total propellant gas flow, and more typically about seventy percent 70%)) is to the second chamber 418 (known as the afterburner for reasons discussed below). The second chamber 418 of the gas generator housing 366 is fluidly interconnected with the first chamber 394 of the gas generator housing 366 by at least one propellant port 416 (two illustrated) which extends through the gas generator partition 390. As will be discussed in more detail below, the principal flow path for the pressurized medium in the stored gas housing 354 to the air/safety bag 18 (FIG. 1) is also directly into the second chamber 418. In order to induce a sufficient "mixing" of the propellant gases flowing into the second chamber 418 from the first chamber 394 with pressurized medium flowing into the second chamber 418 from the stored gas housing 354 (e.g., to retain the gases therein for a sufficient period of time), the propellant ports 416 may be oriented to induce a vortex-like motion (e.g., being introduced with at least a radial velocity component) within the second chamber 418. One way of inducing this vortex-like motion is by orienting the substantially linearly extending gas generator propellant ports 416 in the manner illustrated in FIG. 9. The ports 416 are oppositely "inclined" within their respective reference planes.

The second chamber 418 of the gas generator housing 366 is longitudinally aligned with the first chamber 394 and separated therefrom by the gas generator partition 390 with a portion of the stored gas housing 354 being circumferentially disposed thereabout. The second chamber 418 is defined by an intermediate portion of the central housing 358, the gas generator partition 390, and the gas generator end cap assembly 420. The gas generator end cap is appropriately attached to the central housing (e.g., via welding at weld 454), and the upper portion of the central housing 358 is appropriately attached to the upper portion of the stored gas housing 354 (e.g., via welding at weld 450). Preferably, both welds 450 and 454 define a hermetic seal since the second chamber 418 contains a quantity of the pressurized medium in the static state. The gas generator end cap assembly 420 contains at least one gas generator outlet 424 (one shown). In order to appropriately retain the pressurized medium within the inflator 350 and specifically the second chamber 418 until the desired time, a second closure disk 428 is appropriately attached to the gas generator end cap assembly 420 (e.g. sandwiched between an upper gas generator end cap 421 and a lower gas generator end cap 422) to achieve a preferably hermetic seal (e.g., via welding at weld 454).

Based upon the fluid interconnection between the first chamber 394 and the second chamber 418, propellant gases produced by combustion of the propellant grains 404, as well as gases generated by ignition of the ignition/booster material 408, are thus directed at least in part into the second chamber 418. Due to the rapid pressure increase therein and as controlled in the manner discussed below, the second closure disk 428 opens at the appropriate time such that the flow from the inflator 350 is directed to the diffuser 458 and then to the air/safety bag 18 (FIG. 1). In order to provide for a relatively non-thrusting output to the air/safety bag 18 (FIG. 1), the diffuser 458 utilizes a plurality of diffuser ports 462. A diffuser screen (not shown) may also be contained within the diffuser 458 to retain rupture disk fragments within the inflator 350 and/or to further promote mixing/ reaction of the propellant gases and pressurized medium prior to passing to the air/safety bag 18 (FIG. 1).

Figure 14A:
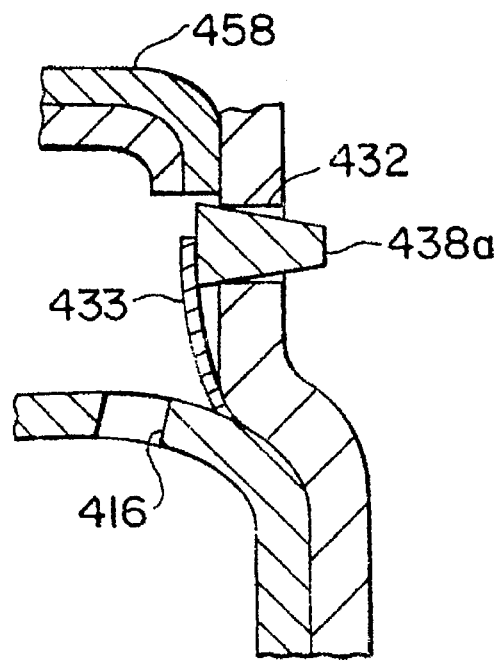
FIGS. 14A and B are cross-sectional views of alternative embodiments of a valve for the hybrid inflator of FIGS. 5 and 8.
Figure 14B:
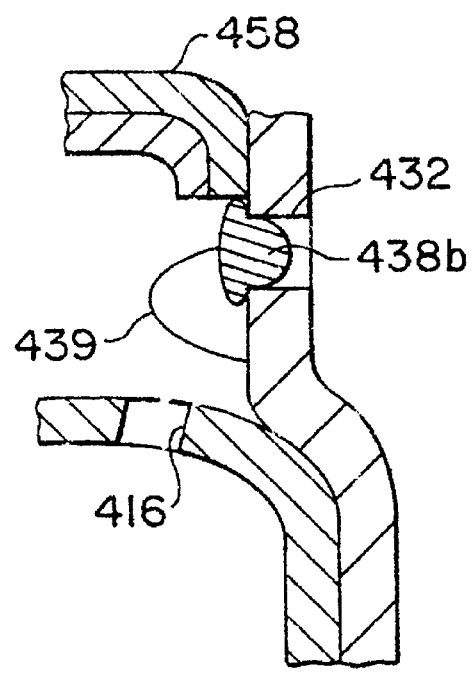

The second chamber 418 is also fluidly interconnectable with the stored gas housing 354. In this regard, at least one and preferably a plurality of gas generator inlet ports 432 provide for a fluid interconnection between the stored gas housing 354 and the second chamber 418 such that pressurized medium from the stored gas housing 354 may flow into the second chamber 418 at the appropriate time. That is, for certain designs/applications this particular flow can be controlled as to the direction of flow. Specifically, a valve 438 can be positioned adjacent to at least one and preferably all of the gas generator inlet ports 432. In the static state, it is not required that the valve 438 actually isolate the stored gas housing 354 from the second chamber 418 in this region. In fact, a quantity of pressurized medium is preferably retained within the second chamber 418 in the static state such that a non-sealing interface would accommodate such a supply. One configuration for the valve 438 which does not isolate the second chamber 418 from the stored gas housing 354 over the ports 432 is a roll of shim stock (e.g., stainless steel, 0.002" thick). A cantilever connection may be utilized between the valve 438 and the interior of the gas generator housing 366. That is, a rearward portion of the valve 438 may be retained between the central housing 358 and the partition 390 with the forward portion thereof remaining unattached and thus free to move/deflect to provide operational capabilities for the valve 438. Although the configuration of the valve 438 is presently preferred, an individual plug 438a, 438b (FIGS. 14A–B) could be disposed in each of the ports 432. These plugs 438a, 438b would preferably be interconnected with the inflator 350 by a tether 439 or the like (shown in FIG. 14B only). It may also be desirable to support the plugs 438a, 438b within the ports 432 with a pliable member 433 (FIG. 14A only). The plugs 438a, 438b could also be used with other hybrid inflators described herein.

Based upon the foregoing, in the static state the pressure throughout the stored gas housing 354 and the gas generator 362 may thus be substantially equal. However, in the dynamic state or after ignition of the propellant grains 404 the pressure throughout the various "chambers" of the inflator 350 differs to achieve a desired performance. In this regard, when the propellant grains 404 are ignited, propellant gases begin flowing into at least the second chamber 418 to cause a pressure increase therein. When at least one bleed port 400 is incorporated into the design, some propellant gases also flow into the stored gas housing 354 as well to cause a pressure increase therein. Preferably, the pressure increases at a greater rate within the second chamber 418 than in the stored gas housing 354 due to the introduction of propellant gases therein and their respective volumes. This pressure differential forces the valve 438 against the interior of the aligned portion of the gas generator housing 366 and thereby temporarily isolates the stored gas housing 354 from the second chamber 418 in this region by covering the gas generator inlet ports 432. When the pressure within the second chamber 418 reaches a predetermined level, the fluid pressure itself opens, ruptures, or breaks the second closure disk 428. This thereby initiates flow from the gas generator 362 to the diffuser 458, and then to the air/safety bag 18 (FIG. 1).

As will be appreciated, the valve 438 allows for a timely initiation of flow to the air/safety bag 18 (FIG. 1) in certain designs/applications. Specifically, for certain designs the use of the valve 438 allows the second chamber 418 to pressurize at a rate which will timely open the second closure disk 428. If no valve 438 was utilized in the inflator 350, propellant gases would flow into the stored gas housing 354 from the second chamber 418. As such, it could take longer for the pressure within the second chamber 418 to increase to the level where it would rupture the second closure disk 428. However, the use of the second chamber 418 provides a smaller pressurization chamber which thereby reduces the time required to initiate flow to the air/safety bag 18 (FIG. 1). As will be discussed below, in some designs the volume of the second chamber 418 can be made small enough and/or the selection of the propellant and pressurized medium may be such that the valve 438 is not required for satisfactory operations (e.g., by utilizing the combustion of the gases generated by combustion of the propellant grains 404 and/or the ignition/booster material 418 to affect a rapid pressurization within the second chamber 418).

The valve 438 may retain its position and thus block the gas generator inlet ports 432 for a certain time after the second closure disk 428 is opened to initiate flow to the air/safety bag 18 (FIG. 1). Nonetheless, once a predetermined pressure differential develops between the stored gas housing 354 and the second chamber 418, the upper free end of the valve 438 is moved by the force of this pressure differential to expose the gas generator inlet ports 432 such that flow from the stored gas housing 354 into the second chamber 418 is initiated. The lower end of the valve 438 remains attached to the gas generator housing 366. When the valve 438 is from a roll of shim stock, this movement may be radially inwardly toward the central axis 352 or by a collapsing of the valve 438 in at least those regions radially aligned with the gas generator inlet ports 432 to allow for a desired flow therethrough.

The primary function of the second chamber 418, after the rupturing of the second closure disk 428 through rapid pressurization techniques, is to provide/allow for effective mixing of the propellant gases and pressurized medium prior to being discharged to the air/safety bag 18 (FIG. 1). When using the above-identified types of propellant compositions (e.g., gun-type propellants, hybrid propellants) and the above-identified type of pressurized medium (e.g., a mixture of oxygen and an inert fluid such as at least one type of inert gas), this mixing further combusts the propellant gases to provide the noted benefits (e.g., reducing toxicity, reducing the amount of propellant required by the further combustion and the related increased expansive capabilities). As such, the second chamber 418 may be further characterized as an afterburner. Preferably, at least about 99% of all combustion of the propellant gases and ignition/booster material gases, and even more preferably about 100% of the combustion occurs within the inflator 350. This reduces the potential for damage to the air/safety bag 18 (FIG. 1).

Due to the constraints imposed by driver's side applications, it is typically impractical to utilize a "long" second chamber 418 as in the inflator 202 to provide the afterburner function. In order to compensate for using a "shorter" second chamber 418 in the driver's side application of the inflator 350, mixing of the propellant gases and pressurized medium within the second chamber 418 can be further enhanced by introducing a vortex-like motion to the flow into the second chamber 418 from the stored gas housing 354 (primarily pressurized medium, but possibly also a quantity of propellant gases and/or ignition/booster material gases) to promote mixing of the pressurized medium and propellant gases. This increases the time in which the propellant gases and pressurized medium are retained within the second chamber 418 to chemically react.

Figure 10:
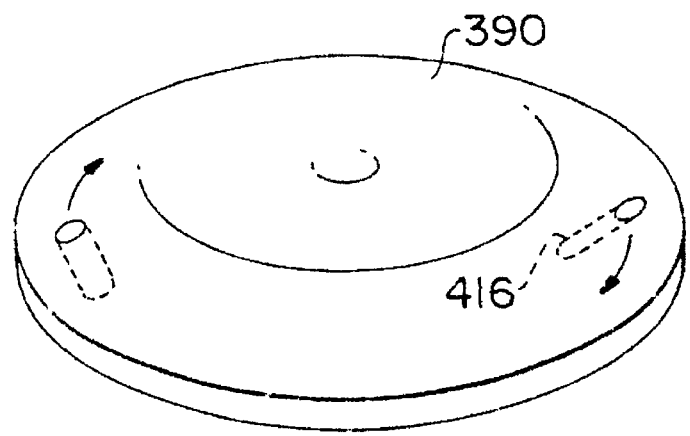
FIG. 10 is a top view of the partition of FIG. 8 between the first and second chambers of the gas generator housing, specifically illustrating the orientation of the propellant ports.

One way of inducing the above-noted vortex-like motion is by orienting the generally linearly extending gas generator inlet ports 432 substantially within a horizontal reference plane, but not having the axes of these ports 432 pass through the central longitudinal axis 352 of the inflator 350 as illustrated in FIG. 10. That is, the substantially linear ports 432 do not project outwardly from the central, longitudinal axis 352 along a radius to interconnect the second chamber 418 and the stored gas housing 354. Instead, one portion of a given port 432 is disposed on one radial location, while another portion is disposed at another radial location. As such, the flow into the second chamber 418 from the stored gas housing 354 is generally in the direction of the arrows A of FIG. 10. In order to induce further mixing of the propellant gases with the incoming pressurized medium, the propellant ports 416 may be further directed to where the gas generator inlet ports 432 interface with the interior of the second chamber 418.

The dimensions of a given design for the inflator 350 may be varied. Especially, the capacity of each chamber of the inflator 350 depends on the inflator applications. For example, the capacity of the inflator housing for one or more aspects associated with the present invention may range from about 50 $cm^3$ to about 150 $cm^3$. The capacity of the first chamber 394 ranges from about 5 $cm^3$ to about 15 $cm^3$. The capacity of the second chamber 418 may range from about 1 $cm^3$ to about 20 $cm^3$. The dimensions are provided herein for one embodiment which should have performance characteristics similar to those presented below: 1) the diameter of the inflator 350 is about three and one-quarter inch (3.25"); 2) the height of the central housing 358 is about one and six-tenths inch (1.6"); 3) the height of the stored gas housing 354 is about one and two-tenths inch (1.2"); 4) the inner volume of the stored gas housing 354 is about five cubic inches (5 $in^3$); 5) the inner volume of the first chamber 394 of the gas generator housing 366 is about seven cubic centimeters (7 cc); 6) the inner volume of the second chamber 418 of the gas generator housing 366 is about two cubic centimeters (2 cc); 7) there are two (2) bleed ports 400 having a diameter of about one and one-half millimeters (1.5 mm); 8) there are two (2) propellant ports 416 having a diameter of about two millimeters (2 mm); 9) the total weight of the propellant grains 404 is about three and one-half grams (3.5 g) and have a composition of the above-described type which includes RDX, CA, TMETN, and stabilizer; 10) the static pressure within the stored gas housing 354 is about four thousand pounds per square inch (4,000 psi) such that there are about forty grams (40 g) of pressurized medium, 85% of which is argon and 15% of which is oxygen (mole percent); 11) the inflator 350 is formed from mild steel; 12) the wall thickness of the stored gas housing 354 is about seventy-five thousandths of an inch (0.075") and has a pressure rating (burst) of about eighteen thousand pounds per square inch (18,000 psi); 13) the wall thickness of the central housing 358 is about six hundred and twenty five ten thousands inch (0.0625"); and 14) the total weight of the inflator 350 is about four hundred grams (400 g).

Figure 11A:
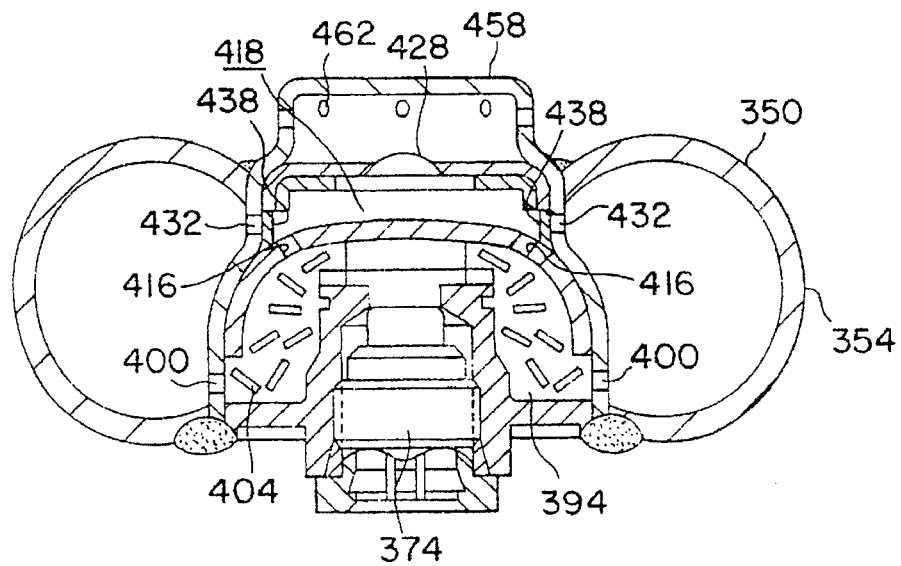
FIGS. 11A–C are enlarged, longitudinal cross-sectional views of the valve and closure disk of the inflator of FIG. 8 at different times during operation.

The operation of the inflator 350 will be summarized by reference to FIGS. 11A–D. When an appropriate signal is received from the detector/sensor 14 (FIG. 1), the ignition assembly 374 is activated which ruptures the first closure disk 378 and ignites the ignition/booster material 408, which in turn ignites the propellant grains 404 as illustrated in FIG. 11A. Combustion of the propellant grains 404 generates propellant gases within the first chamber 394 which flow into both the second chamber 418 of the gas generator housing 366 and into the stored gas housing 354 where such propellant gases mix with pressurized medium. Due to the presence of the hot propellant gases within the first chamber 394 and the introduction of the hot propellant gases into both the second chamber 418 and the stored gas housing 354, the corresponding pressure within these "vessels" also increases.

In order to rupture the second closure disk 428 at an appropriate time and thus to initiate the flow to the air/safety bag 18 (FIG. 1), the rate of pressure increase within the second chamber 418 is designed to be greater than the rate of pressure increase within the stored gas housing 354 due to the introduction of hot propellant gases therein and their respective volumes. This pressure differential seats the valve 438 against the interior of the gas generator housing 366 to isolate the stored gas housing 354 from the second chamber 418 in this region as also illustrated in FIG. 11A. Since the supply of pressurized medium to react with the propellant gases is thus suspended, the amount of pressurized medium within the second chamber 418 in the static state should be sufficient to react with the propellant gases introduced thereto prior to establishing fluid communication between the stored gas housing 354 and the second chamber 418.

Figure 11B:
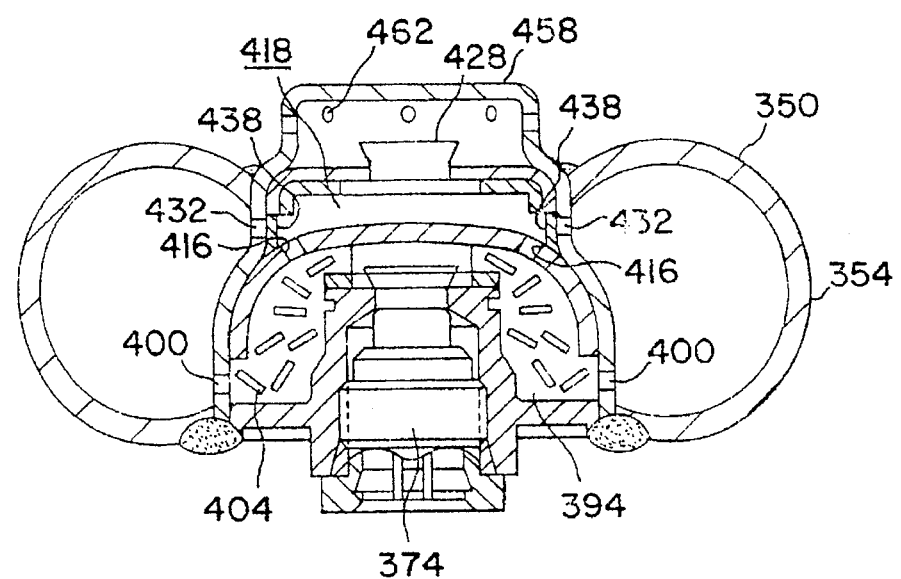
Figure 11C:
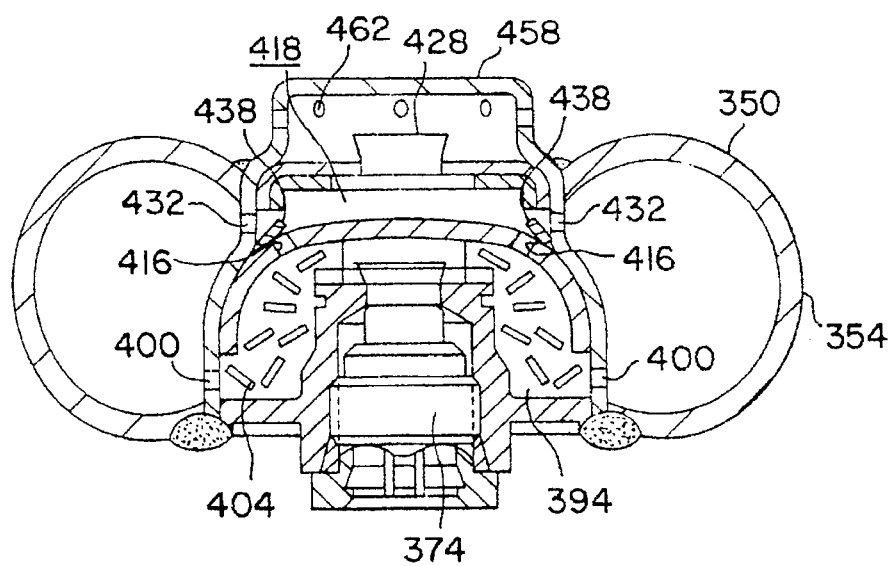

Once the pressure within the second chamber 418 reaches a predetermined magnitude, the pressure ruptures the second closure disk 428 as illustrated in FIG. 11B such that there is a flow through the gas generator outlet(s) 424, to the diffuser 458, and to the air/safety bag 18 (FIG. 1). However, the valve 438 continues to impede the flow into the second chamber 418 directly from the stored gas housing 354 by blocking the gas generator inlet ports 432. After a certain pressure differential develops between the stored gas housing 354 and the second chamber 418, the resulting force moves or deflects the valve 438 away from the gas generator inlet ports 432 to establish a flow of pressurized medium from the stored gas housing 354 to the second chamber 418. For instance, with the illustrated structure for the valve 438 (e.g., a roll of shim stock), the one-way check valve 438 will collapse under the noted pressure differential at least in those regions proximate or aligned with the gas generator inlet ports 432. In order to promote a mixing of this pressurized medium with the propellant gases which are continually provided to the second chamber 418 via the first chamber 394 and as noted above, both the flow of the pressurized medium and propellant gases into the second chamber 418 may be in a vortex-like pattern. This increases the amount of time which the mixture is retained within the second chamber 418 prior to being provided to the air/safety bag 18 (FIG. 1).

Pressure curves for a test model of the above-described embodiment having similar dimensions and other characteristics is illustrated in FIG. 12. These curves are generally the same as those presented in FIGS. 13A–D discussed in more detail below. Initially, the static pressure within the inflator 350 is about 4,000 psi. At time T1 (about 5 ms), the inflator 350 is activated and the propellant grains 404 are ignited. As such, propellant grains 404 increase the pressure in each of the first chamber 394, the stored gas housing 354, and the second chamber 418. The maximum pressure within the first and second chambers 394, 418 occurs at time T2 and at which rupturing of the second closure disk 428 occurs. At time T2 (about 1 millisecond after activation), the pressure within the first chamber 394 has increased from the 4,000 psi static condition to about 10,000 psi, the pressure within the second chamber 418 has increased from the 4,000 psi static condition to about 7,000 psi, and the pressure within the stored gas housing 354 has increased from the 4,000 psi static condition to about 4,500 psi.

After the second closure disk 428 is opened, there is a pressure drop within the second chamber 418. At time T3, the pressure differential between the stored gas housing and the second chamber 418 is sufficient to open the valve 438 and thereby expose the gas generator inlet ports 432 such that the pressure again increases within the second chamber 418. That is, after time T3 there is a flow into the second chamber 418 from both the stored gas housing 354 and the first chamber 394. The pressure increases within the second chamber 418 to a maximum of about 4,750 psi at time T4 and thereafter decays. This substantially coincides with the time at which the maximum pressure exists in the stored gas housing 354 which is about 5,000 psi. As such, it can be seen that the pressure increases within the inflator 350 are principally concentrated in the gas generator 362 versus the stored gas housing 354. Therefore, the wall thickness of the stored gas housing 354 may be reduced as noted above. Moreover, with the pressure being relatively constant in second chamber 418 (fluctuating only between 4000 psi and about 4600 psi), a desired output may be provided to the air/safety bag 18 (FIG. 1).

As noted, in certain designs the inflator 350 may be generally configured as discussed above, but without utilizing the valve 438. This may be possible by utilizing the above-described types of propellants and pressurized medium, namely a propellant which generates propellant gases which may be further combusted in the second chamber 418 by mixing with an oxidizing pressurized medium (e.g., a multi-component mixture of oxygen and an inert fluid such as one or more types of inert gases; e.g., argon, nitrogen). In this case, the "secondary" combustion of the propellant gases, and possibly secondary combustion of gases resulting from ignition of the ignition/booster material 408, within the second chamber 418 affects a sufficient pressure increase/rate of increase such that the valve 438 may not be required. For instance, the secondary combustion may account for at least about thirty percent (30%) of the pressure increase/rate of pressure increase within the second chamber 418 after activation of the inflator 350, and possibly up to about fifty percent (50%). As such, it is possible to achieve a rapid pressurization-based flow initiation using a chemical reaction in the second chamber 418, thereby alleviating the need for the valve 438.

Pressure curves for the pressures within the first chamber 394, the second chamber 418, and the stored gas housing 354, and in a fixed wall vessel representative of the air/safety bag 18 (FIG. 1) are illustrated in FIGS. 13A–D, respectively, for an inflator 350 configured in the above-described manner but without the valve 438. As can be seen by a comparison of FIG. 12 and FIGS. 13A–C, comparable performance was achieved without the use of the valve 438. This can again be principally attributed to the use of the particular types of propellants and pressurized medium to provide for a combustion of gases within the second chamber 418 to realize to affect a rapid pressurization within the second chamber 418 to open the second closure disk 428.

Figure 15:
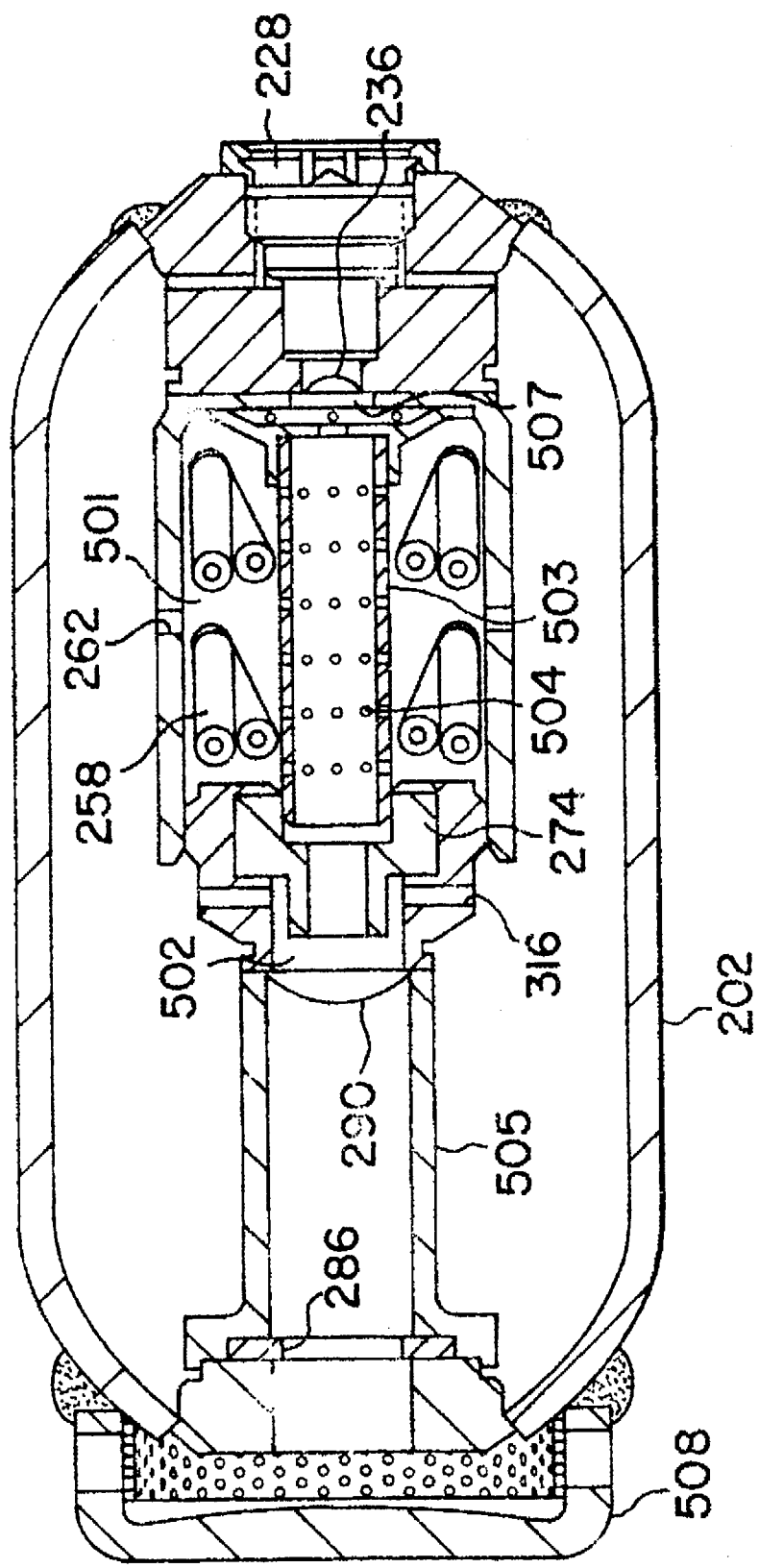
FIG. 15 is a longitudinal cross-sectional view of another embodiment of a hybrid inflator.

FIG. 15 shows a modification of the inflator according to the present invention. The modified inflator has a structure similar to the inflator shown in FIG. 5. Accordingly, we will omit the description of the similar structure, but will refer to numerals identical to the numerals denoting the members of the inflator of FIG. 5. Certain differences between the modified inflator of FIG. 15 and the inflator of FIG. 5 will be discussed below.

A first chamber 501 has an inner diameter larger than an inner diameter of a second chamber 502. The length of the second chamber 502 is set excessively less than the length of the second chamber 324 of FIG. 5. Accordingly, the second chamber 502 has the capacity extremely smaller than the capacity of the first chamber 501. The capacity of the second chamber 502 is about one twentieth of the capacity of the first chamber 501 in this embodiment.

A transfer tube 503 is located on the axis of the first chamber 501 and connects the initiator 228 to the aspirator nozzle 274. The transfer tube 503 is hollow and has a plurality of interconnecting ports 504 at the peripheral wall. The transfer tube 503 and the aspirator nozzle 274 allow for communicating the first chamber 501 with the second chamber 502 (e.g., it assists in keeping solid propellant out of the axial path between the initiator 228 and the disk 290). The first closure disk 236 generally closes a passage 507 defined between the initiator 228 and the first chamber 501.

The second chamber 502 is connected to the outlet port 286 by an afterburner pipe 505. The second closure disk 290, located near the second chamber 502 and the aspirator nozzle 274, normally closes the outlet port 286 via the pipe 505. The bleed ports 262 communicate the first chamber 501 with the stored gas housing 204. Inlet ports 316 is provided with the second chamber 502. The inlet ports 316 are opened in the static state because the valve 320 does not closely contact the inner wall of the second chamber 502.

In the static state, the pressures in the stored gas housing 204, the first chamber 501 and the second chamber 502 by means of the aspirator nozzle 274, the transfer tube 503, the inlet ports 316 and the bleed ports 262. In this state, when the initiator 228 is activated, the first closure disk 236 is broken and the propellant grains 258 are burnt. Combustion gases generated from the propellant grains 258 increase the pressure in the first chamber 501 and then increase the pressure in the second chamber 502 via the transfer tube 503 and the aspirator nozzle 274. The increased pressure moves the valve 320 toward the wall of the second chamber 502 to close the inlet ports 316. The combustion gases are injected from the aspirator nozzle 274 toward the pipe 505 to break the second closure disk 290.

Then, the pressure in the second chamber 502 temporarily decreases to allow the valve 320 to open the inlet ports 316. Consequently, the pressurized medium goes into the second chamber 502 and the pipe 505 through the inlet ports 316. The oxygen in the pressurized medium chemically reacts with carbon monoxide and hydrogen in the combustion gases to convert them to carbon dioxide and water vapor within the second chamber 502 and the pipe 505. Carbon dioxide, water vapor and argon in the pressurized medium are supplied to an air bag (not shown) through the outlet port 286 and a diffuser 508 to inflate the air bag.

As mentioned above, the second chamber 502 is formed smaller than the first chamber 501 in this embodiment. Also, the second closure disk 290 is located near the aspirator nozzle 274. Consequently, in addition to the same effect and advantages as the inflators shown in FIGS. 5 and 8, the increase of pressures in the first and the second chambers 501 and 502 occurs rapidly in the present embodiment, thus breaking the disk 290 rapidly.

The transfer tube 503 having a plurality of ports 504 can increase the velocity of combustion gas flow when the flow passes through the ports 504. This assists the rapid breakage of the disk 290.

It is noted that the transfer tube 503 is applicable to the embodiment shown in FIG. 5. Furthermore, with respect to the opening area of each aspirator nozzle shown in FIGS. 5 and 8, and the sum of opening areas of the bleed ports, it can be decided which one may be greater than the other, depending on whether the pressurized medium or the propellant gas is introduced into the first chamber.

Table 2 indicates physical characteristics of the inflators shown in FIGS. 5, 8 and 15 which may be appropriate for use in conjunction with one or more aspects associated with the present invention. Table 2 indicates, for example, value ranges of propellant grains, pressurized gases and pressurized medium.

TABLE 2

| | passenger side | driver side | side inflator |
|---|---|---|---|
| propellants (g) | applicable range: about 0.5 to about 20 | | |
| | about 6 to about 20, optimally about 6 to about 15 | about 2 to about 8, optimally about 2 to about 6 | about 0.5 to about 2 |
| combustion velocity of propellants (cm/s) | about 0.25 to about 5 | | |
| combustion temp. of propellants (°K.) | about 2000 to about 3800 | | |
| heat of propellants (cal/g) | about 800 to about 1300 | | |
| pressurized medium (g)/ propellants (g) | about 8 to about 25 | | |
| capcity of inflator housing (cm³) | applicable range: about 10 to about 450 | | |
| | about 150 to about 450 | about 50 to about 150 | about 10 to about 50 |
| thickness of inflator housing (mm) | applicable range: about 1 to about 4 | | |
| | about 2.5 to about 4 | about 1 to about 3 | about 1 to about 3 |
| composition of pressurized medium (in a molar basis | inert fluid: about 70% to about 92%, preferably about 79% to 90% oxygen: about 8% to about 30%, preferably about 10% to about 21% | | |
| CO+H₂/propellant gases (mol/ mol) % | about 30 to about 70 | | |
| propellant gases (mol)/ propellants (g) | about 0.3 to about 0.6 | | |
| pressure of pressurized medium (psi) | about 2000 to 7000 | | |
| He content in medium (%) | about 0.5 to about 10, preferably about 1 to about 5 | | |

Figure 16:
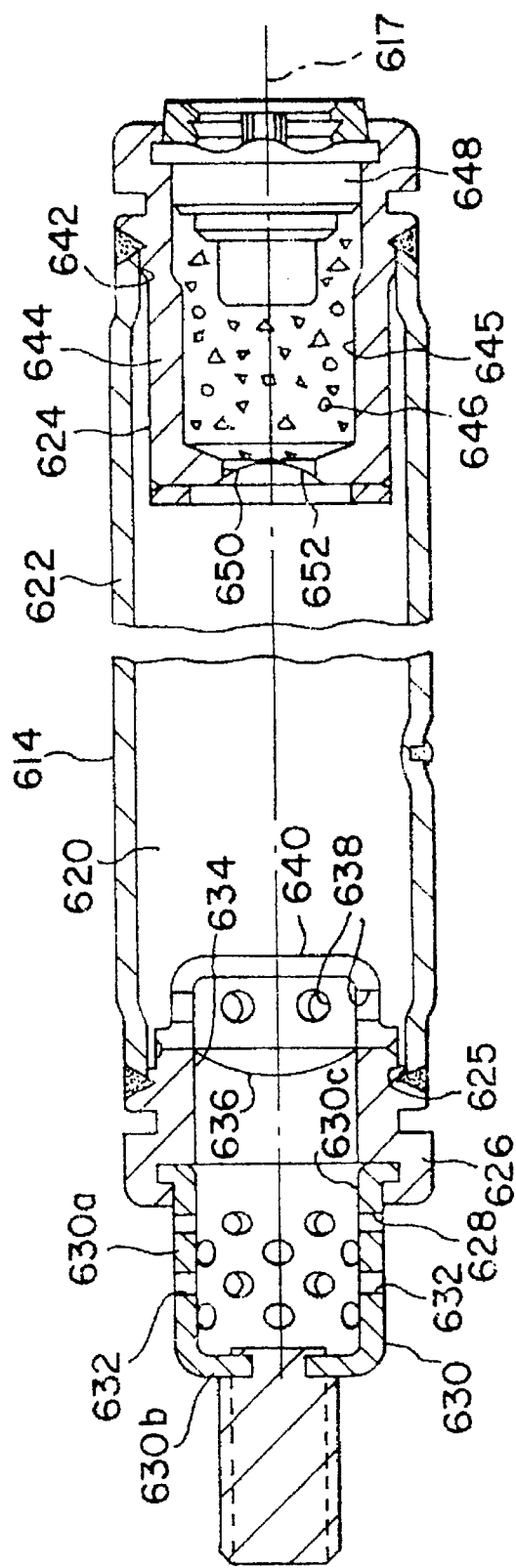
FIG. 16 is a longitudinal cross-sectional view of another embodiment of a hybrid inflator.

Another embodiment of a hybrid inflator which may be used with one or more aspects of the present invention and which may be incorporated into the inflatable safety system 10 of FIG. 1 is illustrated in FIG. 16. The inflator 614 includes a cylindrical inflator housing 622 having a pressurized medium 620 that is provided to the air/safety bag 18 (FIG. 1), as well as a gas generator 624 that generates propellant gases for expanding the pressurized medium 620 to increase the flow to the air/safety bag 18.

The inflator 614 may be used as a side impact inflator and thus may be attached to a seat or a door of a vehicle (e.g., used to protect occupants when the vehicle is bumped sideways). The pressurized medium 620 may include an inert fluid (e.g., argon) and oxygen and the above-noted types of propellants may also be utilized.

A gas generator housing 644 is welded to the right end opening 642 of the inflator housing 622, part of which is disposed within the inflator housing 622. Within a container chamber 645 of the gas generator housing 644 is contained a propellant 646 (e.g., of the above-described types) which generates propellant gases when it is burned and is disposed a propellant ignition assembly 648. The gas generator housing 644 and the propellant ignition assembly 648 are arranged on a longitudinal axis 617 of the inflator housing 622.

The propellant 646 may be a nitramine propellant and desirably comprises, for example, about 70 wt % RDX (hexahydrotrinitro triazine), from about 5 wt % to about 15 wt % cellulose acetate and from about 5 wt % to about 15 wt % GAP(glycidyl azide polymer). The propellant 646 generates combustible gases which include carbon monoxide and hydrogen when it is burned.

The gas generator housing 644 includes an interconnecting port 650 at its inner end, which is normally blocked by a first disk 652. A ring-shaped connector 626 is welded to the left end opening 625 of the inflator housing 622. A cap-shaped diffuser 630 is fixed at the left end opening 628 of the connector 626. The diffuser 630 includes a peripheral wall 630a having a plurality of holes 632 and a top wall 630b. The diffuser 630 is arranged on the axis 617 and is fluidly interconnected with the air/safety bag 18 (FIG. 1).

A right end opening of the connector 626 forms an outlet port 634 of the inflator housing 622. A second disk 636 is disposed at the outlet port 634, which normally blocks the outlet port 634. The diffuser 630 includes an opening 630c which is fluidly interconnected with the outlet port 634. A cap 640 with a plurality of holes 638 is attached to the connector 626 so as to cover the outlet port 634. Accordingly, the inner inflator housing 622 is normally closed by the two disks 636, 652 and a peripheral wall of the inflator housing 622. The container chamber 645 is fluidly interconnected with the inside of the inflator housing 622 by the interconnecting port 650, while the inside of the inflator housing 622 is fluidly interconnected with the outlet port 634 by the holes 638 when the first and second disk 652 and 636 are ruptured.

In one embodiment, a distance between the first and second disks 652 and 636 is desirably about 20 mm to about 70 mm. The amount of the pressurized medium 620 within the inflator housing 622 may range from about 40 cm$^3$ to about 100 cm$^3$. The amount of the pressurized medium 620 within the inflator housing 622 in one embodiment is more preferably from about 50 cm$^3$ to about 90 cm$^3$. The inside of inflator housing 622 may be maintained at a high pressure of about 4,000 psi.

When the propellant ignition assembly 648 is activated in response to a signal from the detector 612, the propellant 646 is burned to generate combustible gases. The combustible gases include carbon monoxide and hydrogen. The combustible gases increase the pressure within the gas generator housing 644 to rupture the first disk 652. Then the combustible gases flow into the inflator housing 622 through the interconnecting port 650 and are mixed with the pressurized medium 620 therein.

The pressurized medium 620 includes oxygen, which reacts with the carbon monoxide and hydrogen in the combustible gases to generate carbon dioxide and water vapor. The combustible gases increase the pressure within the inflator housing 622, which acts on the second disk 636 via the holes 638. That is, the gases must flow around the end wall 641 of the cap 640 and into the holes 638. This facilitates a more complete combustion within the housing 622. The end wall 641 thus may be said to function as a propellant trap which is disposed at the outlet to the inflator 614.

The second disk 636 is ruptured by the increase in pressure adjacent thereto and when ruptured, supplies high pressure carbon dioxide, water vapor and the inert gas to the air/safety bag 18 (FIG. 1) via the outlet port 634 and the holes 632 of the diffuser 630. Thus the air/safety bag 18 (FIG. 1) is effectively expanded a predetermined amount in a predetermined amount of time.

As described above, the first and second disks 652, 636 and the diffuser 630 are disposed on the axis 617 of the inflator housing 622 in this embodiment so that the whole inflator can be formed in a compact cylindrical shape. Consequently, the inflator can be firmly attached in a limited space such as the inside of the door or the seat of a vehicle without modifying the configuration of the door or the seat.

In this embodiment, the propellant 646 generates combustible gases which include carbon monoxide and hydrogen when it is burned. The combustible gases react with the oxygen in the pressurized medium 620 to be converted to carbon dioxide and water vapor. Accordingly, the air/safety bag 18 (FIG. 1) can be expanded by substantially innoxious gases to occupants.

The diffuser 630 is formed in a cap-like shape and includes the peripheral wall 630a and the top wall 630b. The diffuser 630 furthermore includes the opening 630c fluidly interconnected with the outlet port 634 and a plurality of the holes 632 fluidly interconnected with the opening 630c in the peripheral wall 630a. Therefore, the air/safety bag 18 (FIG. 1) can be more effectively expanded by gases discharged from a plurality of the holes 632 in all directions when gases are released from the inflator housing 622.

Figure 16A:
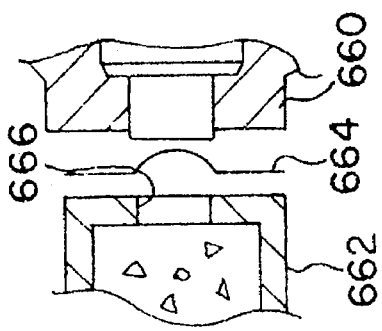
FIG. 16A is a variation of the hybrid inflator of FIG. 16.

FIG. 16A shows a modification of the inflator of FIG. 16. In this modification, the gas generator housing 624 comprises a base section 660 and a chamber section 662. The base section 660 supports the ignition assembly 648. The chamber section 662 accommodates the propellants 646. A disk 664 is disposed between the base section 660 and the chamber section 662 and is clamped with them. The disk 664 normally closes a through hole 666 of the chamber section 662. The chamber section 652 is fluidly interconnected with the inflator housing 622 via the interconnecting port 650. Accordingly, the inside of chamber section 652 is under pressure.

When the ignition assembly 648 is activated, the ignition assembly 648 directly ruptures the disk 664 and ignites the propellant to generate combustible gases. The combustible gases react with the oxygen in the pressurized medium 620 to be converted to carbon dioxide and water vapor. Accordingly, the air/safety bag can be expanded by substantially innoxious gasses to occupants.

The foregoing description of the invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known of practicing the invention and to enable others skilled in the art to utilize the invention in such, or other, embodiments and with the various modifications required by the particular applications or uses of the invention. It is intended that the appended claims be construed to include alternative embodiments to the extent permitted by the prior art.

What is claimed is:

1. A hybrid inflator for an automotive inflatable safety system comprising an air/safety bag, said inflator comprising:

a stored gas housing which contains a pressurized medium;

a gas generator comprising a gas generator housing, a propellant contained within said gas generator housing, at least one gas generator inlet port which fluidly interconnects said gas generator housing and said inflator housing, and at least one gas generator outlet port which fluidly interconnects said gas generator housing and the air/safety bag;

a propellant ignition assembly interconnected with said gas generator; and valve means, operatively associated with said at least one gas generator inlet port, for substantially inhibiting flow between said inflator housing and said gas generator housing through said at least one gas generator inlet port until a pressure within said inflator housing exceeds a pressure within said gas generator housing by a predetermined degree after said propellant ignition assembly is activated.

2. A hybrid inflator as claimed in claim 1, wherein:

said pressures within said inflator housing and said gas generator housing are substantially equally maintained before said propellant ignition assembly is activated.

3. A hybrid inflator as claimed in claim 1, further comprising:

a plurality of said gas generator inlet ports, wherein said valve means is operatively associated with each of said plurality of said gas generator inlet ports.

4. A hybrid inflator as claimed in claim 1, wherein:

said gas generator housing comprises first and second fluidly interconnected chambers, said propellant being within said first chamber, said second chamber being positioned between said at least one gas generator outlet and said first chamber.

5. A hybrid inflator as claimed in claim 4, further comprising:

a closure disk between said at least one gas generator outlet and the air/safety bag;

means for pressurizing said second chamber of said gas generator housing at a greater rate than said inflator housing after ignition of said propellant; and means for opening said closure disk, said means for opening comprising said means for pressurizing.

6. A hybrid inflator as claimed in claim 5, wherein:

said means for pressurizing comprises an aspirator nozzle disposed between said first and second chambers.

7. A hybrid inflator as claimed in claim 5, wherein:

said means for pressurizing comprises means for inducing a vortex flow within said second chamber.

8. A hybrid inflator as claimed in claim 1, wherein:

said valve means is movable from a first position to a second position, said valve means being in said first position and substantially inhibiting said flow when operational and moving to said second position and allowing said flow when said pressure within said inflator housing exceeds said pressure within said gas generator housing by a predetermined degree, said second position being radially inward of said first position.

9. A hybrid inflator as claimed in claim 1, wherein:

said valve means comprises a pliable member positioned within said gas generator housing, wherein said pliable member is pressed into substantial abutting relationship with said gas generator housing and thereby blocks said at least one gas generator inlet port until said pressure in said inflator housing exceeds said pressure in said gas generator housing by said predetermined degree, and wherein said pliable member moves away from said gas generator housing after said pressure in said inflator housing exceeds said pressure in said gas generator housing by said predetermined degree, whereby a flow from said inflator housing into said gas generator housing through said at least one gas generator inlet port is established.

10. A hybrid inflator as claimed in claim 9, wherein:

said pliable member is made of a metallic sheet.

11. A hybrid inflator as claimed in claim 1, wherein:

said valve means comprises a plug associated with said at least one gas generator inlet port, said plug being movable from a first position for blocking said at least one gas generator inlet port to a second position for opening said inlet port.

12. A hybrid inflator as claimed in claim 11 wherein:

said plug is supported by a pliable member.

13. A method for operating an inflatable safety system comprising an air/safety bag and an inflator comprising an inflator housing, a pressurized medium contained within said inflator housing, a main closure disk disposed between said pressurized medium and the air/safety bag, and a gas generator fluidly interconnected with said inflator housing and comprising first and second fluidly interconnected chambers, said first chamber containing a propellant, wherein said second chamber is positioned between said first chamber and said main closure disk, interfaces with said main closure disk, and is fluidly interconnectable with said inflator housing by a plurality of ports, said method comprising the steps of:

generating propellant gases from said propellant;

providing at least a portion of said propellant gases from said first chamber to said second chamber;

substantially inhibiting a flow of said propellant gases from said second chamber into said inflator housing during a first portion of said generating step, said substantially inhibiting step comprising at least one of performing first and second steps, said performing a first step comprising biasing a valve assembly, disposed within said second chamber of said gas generator, toward sealing engagement with said gas generator to substantially seal said ports, said performing a second step comprising pressurizing said second chamber, wherein said ports are substantially sealed by said pressurizing step;

opening said main closure disk using said substantially inhibiting step;

allowing a flow from said inflator housing into said second chamber during a second portion of said generating step and after said substantially inhibiting step; and directing a flow to the air/safety bag after said opening step.

14. A method, as claimed in claim 13, wherein:

said opening step comprises providing a flow path from said second chamber to said main closure disk and exerting a rupturing fluid pressure directly on said main closure disk through said flow path.

15. A method, as claimed in claim 13, wherein:

said generating step comprises generating propellant gases with a toxicity, said method further comprising the step of mixing said propellant gases and said pressurized medium to reduce said toxicity of said propellant gases and to combust said propellant gases.

16. A method, as claimed in claim 13, wherein:

said providing step comprises inducing a vortex flow within said second chamber.

17. A method, as claimed in claim 13, wherein:

said providing step comprises introducing a flow from said first chamber into said second chamber with at least a peripheral velocity component.

18. A method, as claimed in claim 13, wherein:

said substantially inhibiting step continues after said opening step.

19. A method, as claimed in claim 13, wherein:

said substantially inhibiting step comprises blocking a flow path between said inflator housing and said gas generator with said valve assembly.

20. A method, as claimed in claim 19, wherein:

said allowing step comprises moving said valve assembly out of said flow path between said inflator housing and said gas generator.

21. A method, as claimed in claim 20, wherein:

said moving step comprises collapsing at least a portion of said valve assembly.

22. A method, as claimed in claim 20, wherein:

said moving step comprises sensing a predetermined pressure differential between a pressure in said inflator housing and a pressure in said second chamber.

23. A method, as claimed in claim 13, wherein:

said opening step comprises pressurizing said second chamber at a greater rate than said inflator housing with said propellant gases from said generating step.

24. A method, as claimed in claim 13, wherein:

said allowing step is performed when a pressure within said inflator housing exceeds a pressure within said second chamber by a certain amount.

25. A method, as claimed in claim 13, wherein:

said allowing step comprises inducing a circulatory flow within said second chamber.

26. A method, as claimed in claim 13, wherein:

said allowing step comprises introducing said flow from said inflator housing into said second chamber with at least a peripheral velocity component.

27. A method, as claimed in claim 13, further comprising the step of:

monitoring a pressure within said inflator housing and a pressure within said second chamber, wherein a termination of said substantially inhibiting step and a starting of said allowing step is based upon said monitoring step.

28. A method, as claimed in claim 13, further comprising the step of:

providing a portion of said propellant gases from said first chamber to said inflator housing.

29. A method, as claimed in claim 13, further comprising the step of:

maintaining a predetermined differential pressure between said inflator housing and said second chamber for a predetermined period of time after said directing step.

30. A method, as claimed in claim 13, further comprising the steps of:

retaining a supply of said pressurized medium in said second chamber before said generating step; and reacting said pressurized medium in said second chamber with said propellant gases before said allowing step.

* * * * *